(12) United States Patent  
DeSantis

(10) Patent No.: US 8,811,562 B2  
(45) Date of Patent: Aug. 19, 2014

(54) CONTROL ROD DRIVE MECHANISM FOR NUCLEAR REACTOR

(75) Inventor: Paul K. DeSantis, Bentleyville, OH (US)

(73) Assignee: Babcock & Wilcox Nuclear Operations Group, Inc., Euclid, OH (US)

( * ) Notice: Subject to any disclaimer, the term of this patent is extended or adjusted under 35 U.S.C. 154(b) by 831 days.

(21) Appl. No.: 12/722,696

(22) Filed: Mar. 12, 2010

(65) Prior Publication Data

US 2011/0222640 A1    Sep. 15, 2011

(51) Int. Cl.  
  *G21C 7/06* (2006.01)
(52) U.S. Cl.  
  USPC ........................................... 376/235; 376/233
(58) Field of Classification Search  
  USPC ........................... 376/229, 231, 237, 239, 224  
  See application file for complete search history.

(56) References Cited

U.S. PATENT DOCUMENTS

| | | | | |
|---|---|---|---|---|
| 3,607,629 A | * | 9/1971 | Frisch et al. | 376/239 |
| 3,857,599 A | * | 12/1974 | Jones et al. | 294/90 |
| 3,959,072 A | * | 5/1976 | Dupen | 376/237 |
| 4,124,442 A | * | 11/1978 | Zhuchkov et al. | 376/233 |
| 4,187,145 A | * | 2/1980 | Noyes et al. | 376/233 |
| 4,484,093 A | * | 11/1984 | Smith | 310/14 |
| 4,618,471 A | * | 10/1986 | Defaucheux et al. | 376/228 |
| 5,361,279 A | * | 11/1994 | Kobsa et al. | 376/230 |

\* cited by examiner

*Primary Examiner* — Jack W Keith  
*Assistant Examiner* — Sharon M Davis  
(74) *Attorney, Agent, or Firm* — Michael J. Seymour; Eric Marich

(57) ABSTRACT

A control rod drive mechanism (CRDM) comprises a lead screw, a motor threadedly coupled with the lead screw to linearly drive the lead screw in an insertion direction or an opposite withdrawal direction, a latch assembly secured with the lead screw and configured to (i) latch to a connecting rod and to (ii) unlatch from the connecting rod, the connecting rod being free to move in the insertion direction when unlatched, and a release mechanism configured to selectively unlatch the latch assembly from the connecting rod.

19 Claims, 25 Drawing Sheets

CONTROL ROD DRIVE MECHANISM FOR NUCLEAR REACTOR

BACKGROUND

In a pressurized water reactor (PWR) or other type of nuclear reactor, movable control rods are used to control the nuclear reaction. The control rods include a neutron absorbing material, and are arranged to be inserted into the reactor core. In general, the further the control rods are inserted into the core, the more neutrons are absorbed and the more the nuclear reaction rate is slowed. Precise control of the amount of insertion, and accurate measurement of same, is useful in order to precisely control the reactivity. The control rods drive mechanism (CRDM) provides this control.

In an emergency, the control rods can be fully inserted in order to quickly quench the nuclear reaction. In such a "scram", it is useful to have an alternative fast mechanism for inserting the control rods. Additionally or alternatively, it is known to have dedicated control rods that are either fully inserted (thus turning the nuclear reaction "off") or fully withdrawn (thus making the reactor operational). In such systems, the "on/off" rods are sometimes referred to as "shutdown rods" while the continuously adjustable control rods are sometimes referred to as "gray rods".

Given these considerations, it is known to construct a CRDM employing a lead screw that is engaged by a separable roller-nut assembly. During normal operation, the roller-nut assembly is clamped onto the lead screw by an affirmative magnetic force acting against biasing springs. By turning the roller nut the lead screw, and hence the attached control rods, are moved in precisely controllable fashion toward or away from the reactor core. In a scram, the electrical current is cut thus cutting the magnetic force, the biasing springs open the separable roller nut, and the gray rod including the lead screw scrams. An example of such a configuration is disclosed, for example, in Domingo Ricardo Giorsetti, "Analysis of the Technological Differences Between Stationary & Maritime Nuclear Power Plants", M.S.N.E. Thesis, Massachusetts Institute of Technology (MIT) Department of Nuclear Engineering (1977) which is incorporated herein by reference in its entirety.

For an integral pressurized water reactor (integral PWR), it is known to mount the CRDM externally and to couple with the control rods inside the pressure vessel by suitable feedthroughs. To reduce the extent of feedthroughs, it has also been proposed to integrate the CRDM within the pressure vessel. See, for example, Ishizaka et al., "Development of a Built-In Type Control Rod Drive Mechanism (CRDM) For Advanced Marine Reactor X (MRX)", Proceedings of the International Conference on Design and Safety of Advanced Nuclear Power Reactors (ANP '92), Oct. 25-29, 1992 (Tokyo Japan) published by the Atomic Energy Society of Japan in October 1992, which is incorporated herein by reference in its entirety.

Existing CRDM designs have certain disadvantages. These disadvantages are enhanced when an internal CRDM design is chosen in which the complex electro-mechanical CDRM is internal to the high pressure and high temperature environment within the pressure vessel. Placement of the CRDM internally within the pressure vessel also imposes difficult structural challenges.

The separable roller-nut creates a complex linkage with the lead screw that can adversely impact gray rod insertion precision during normal operation. Reattachment of the roller-nut to the lead screw can be complex, and it may not be immediately apparent when contact is reestablished, thus introducing a positional offset after recovery from the scram event. Scramming the lead screw also has the potential to cause irrecoverable damage to the threading or structural integrity of the lead screw. Still further, wear over time can be a problem for the complex separable roller-nut.

Another consideration is reliability. Because rod scramming is a safety-critical feature, it must operate reliably, even in a loss of coolant accident (LOCA) or other failure mode that may include interruption of electrical power, large pressure changes, or so forth.

The control rod position detector is also typically a complex device. In some systems, an external position detector is employed, which requires feedthroughs across the pressure vessel wall. For the internal CRDM of the MRX reactor, a complex position detector was designed in which a transducer generates a torsional strain pulse that passes through a magnetoresistive waveguide, and magnetic field interactions are measured to adduce the rod position. In general, an internal position detector operating on an electrical resistance basis is prone to error due to temperature-induced changes in material resistivity.

BRIEF SUMMARY

In one aspect of the disclosure, a control rod mechanism for use in a nuclear reactor comprises: at least one control rod configured for insertion in a reactor core to absorb neutrons; a hollow lead screw; a motor operatively coupled with the hollow lead screw to drive the hollow lead screw linearly toward or away from the reactor core; a connecting rod connected with the aforementioned at least one control rod and disposed partially inside the hollow lead screw; a latch assembly having latches that when closed operatively connect the connecting rod and the lead screw so that when the latches are closed the connecting rod and the aforementioned at least one control rod move together with the lead screw when the lead screw is driven by the motor; and a release mechanism configured to cause the latches of the latch assembly to open responsive to a scram condition to detach the connecting rod from the lead screw such that the connecting rod and the aforementioned at least one control rod scram but the lead screw remains operatively coupled with the motor and does not scram.

In another aspect of the disclosure, a control rod drive mechanism (CRDM) comprises: a lead screw; a motor threadedly coupled with the lead screw to linearly drive the lead screw in an insertion direction or an opposite withdrawal direction; a latch assembly secured with the lead screw and configured to (i) latch to a connecting rod and to (ii) unlatch from the connecting rod, the connecting rod being free to move in the insertion direction when unlatched; and a release mechanism configured to selectively unlatch the latch assembly from the connecting rod.

In another aspect of the disclosure, a control rod drive mechanism (CRDM) comprises: a plurality of CRDM units each comprising a lead screw and a motor configured to drive the lead screw; and a support mounting the plurality of CRDM units in a nuclear reactor vessel with the motors of adjacent CRDM units arranged at different heights respective to a reactor core of the nuclear reactor vessel. Each CRDM unit is connected with one or more control rods such that the motor driving the lead screw moves the connected one or more control rods toward, away from, or within the reactor core.

In another aspect of the disclosure, a control rod drive mechanism (CRDM) comprises: a lead screw; a drive assembly configured to linearly drive the lead screw in an insertion or opposite withdrawal direction, the drive assembly including a motor and at least one non-separable ball nut coupling with the lead screw; and a latch assembly connected with the lead screw and having (i) a latched state in which the latch assembly is latched to a connecting rod and (ii) an unlatch state in which the latch assembly is not latched to the connecting rod.

In another aspect of the disclosure, a control rod mechanism for use in a nuclear reactor comprises: at least one control rod; a connecting rod connected with the aforementioned at least one control rod at a lower end of the connecting rod; and a control rod drive mechanism (CRDM) including a latch assembly having (i) a latched state in which the latch assembly is latched to an upper end of the connecting rod and (ii) an unlatched state in which the latch assembly is not latched to the upper end of the connecting rod, and a linear drive mechanism configured to drive the latch assembly linearly toward or away from a nuclear reactor core.

In another aspect of the disclosure, in a control rod mechanism as set forth in the immediately preceding paragraph the CRDM is configured to allow the connecting rod to be removed by placing the latch assembly in the unlatched state and drawing the connecting rod away from the nuclear reactor core through the CRDM.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF PREFERRED EMBODIMENTS

Figure 1:
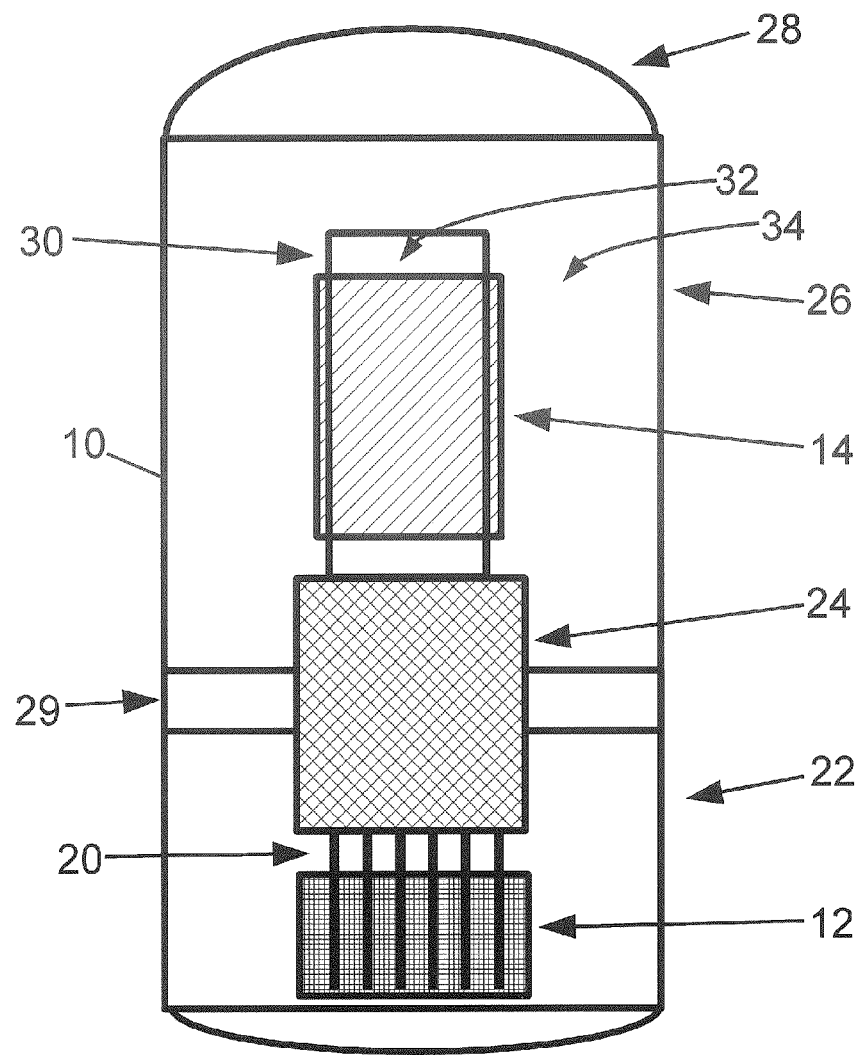
FIG. 1 diagrammatically shows an illustrative nuclear reactor vessel of the pressurized water reactor (PWR) type.

With reference to FIG. 1, an illustrative nuclear reactor vessel of the pressurized water reactor (PWR) type is diagrammatically depicted. An illustrated primary vessel 10 contains a reactor core 12, internal helical steam generators 14, and internal control rods 20. The illustrative reactor vessel includes four major components, namely: 1) a lower vessel 22, 2) upper internals 24, 3) an upper vessel 26 and 4) an upper vessel head 28. A mid-flange 29 is disposed between the lower and upper vessel sections 22, 26. Other vessel configurations are also contemplated. Note that FIG. 1 is diagrammatic and does not include details such as pressure vessel penetrations for flow of secondary coolant into and out of the steam generators, electrical penetrations for electrical components, and so forth.

The lower vessel 22 of the illustrative reactor vessel 10 of FIG. 1 contains the reactor core 12, which can have substantially any suitable configuration. One suitable configuration includes a stainless steel core former structure that contains the fuel assemblies and is replaceable in order to refuel the reactor, and which is supported by the lower vessel. The illustrative upper vessel 26 houses the steam generators 14 for this illustrative PWR which has an internal steam generator design (sometimes referred to as an integral PWR design). In FIG. 1, the steam generator 14 is diagrammatically shown. A cylindrical inner shell or upper flow shroud 30 separates a central riser region 32 from an annular downcomer region 34 in which the helical steam generators 14 are located. The illustrative steam generator 14 is a helical coil design, although other designs are contemplated. Primary reactor coolant flows across the outside of tubes of the steam generator 14 and secondary coolant flows inside the tubes of the steam generator 14. In a typical circulation pattern the primary coolant is heated by the reactor core 12 and rises through the central riser region 32 to exit the top of the shroud 30 whereupon the primary coolant flows back down via the downcomer region 34 and across the steam generators 14. Such primary coolant flow may be driven by natural convection, by internal or external primary coolant pumps (not illustrated), or by a combination of pump-assisted natural convection. Although an integral PWR design is illustrated, it is also contemplated for the reactor vessel to have an external steam generator (not illustrated), in which case pressure vessel penetrations allow for transfer of primary coolant to and from the external steam generator. The illustrative upper vessel head 28 is a separate component. It is also contemplated for the vessel head to be integral with the upper vessel 26, in which case the steam generator 14 and upper shroud 30 are optionally supported by lugs on the inside of the vessel head.

The illustrative embodiment is an integral PWR in that it includes the internal steam generators 14, which in general may have various geometric configurations such as helical, vertical, slanted, or so forth. For the purpose of redundancy, it is generally advantageous to have more than one steam generator, whose pipes or tubes are typically interleaved within the downcomer region 34 to facilitate thermal uniformity; however, it is contemplated to include only a single steam generator. Although the illustrative steam generators 14 are shown disposed or wrapped proximate to the shroud 30, in general the steam generators may fill a substantial volume of the downcomer region 34, and in some embodiments the steam generators may substantially fill the annular volume between the outer surface of the shroud 30 and the inside surface of the pressure vessel 10. It is also contemplated for the internal steam generators or portions thereof to be disposed in whole or in part in the riser region 32, above the shroud 30, or elsewhere within the pressure vessel 10. On the other hand, in some embodiments the PWR may not be an integral PWR, that is, in some embodiments the illustrated internal steam generators may be omitted in favor of one or more external steam generators. Still further, the illustrative PWR is an example, and in other embodiments a boiling water reactor (BWR) or other reactor design may be employed, with either internal or external steam generators.

Figure 2:
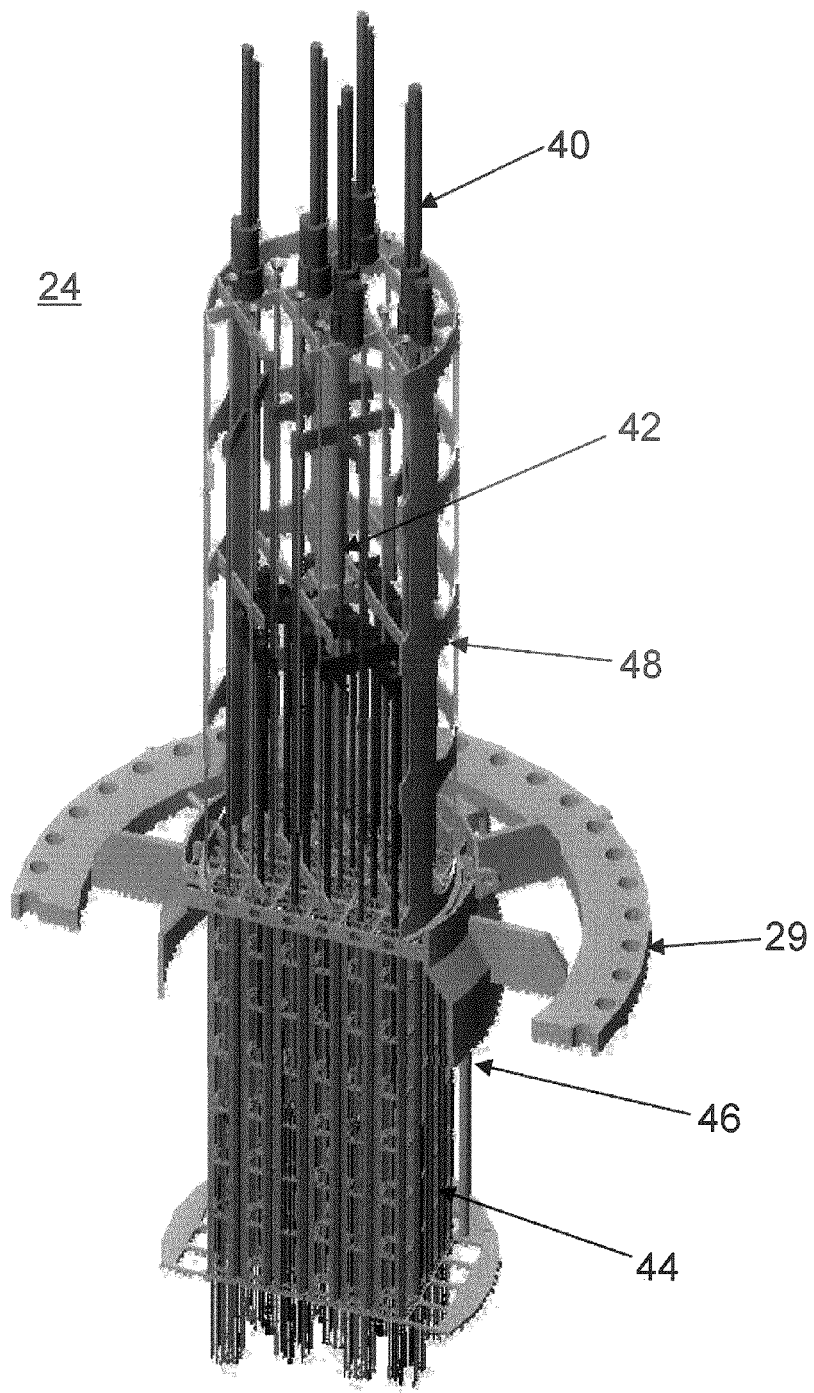
FIG. 2 diagrammatically shows the upper internals section of the illustrative nuclear reactor vessel of FIG. 1.

With reference to FIG. 2, the upper internals section 24 in greater detail. In the illustrative design the upper internals section 24 provides support for control rod drives or drive mechanisms 40, 42 and control rod guide frames 44 and is also the structure through which control rod drive power and control instrumentation signals pass. This allows the upper vessel 26 and integral steam generator 14 to be removed independently of the control rod drives and associated structure. However, a more integrated design is also contemplated, such as using a common section for both the CRDM support and the integral steam generator support.

With particular reference to the illustrative embodiment of FIG. 2, the upper internals structure 24 includes an upper internals basket 46, a CRDM support structure 48, control rod guide frames 44, and the control rod drive mechanisms 40, 42 themselves. The upper internals basket 46 is suitably a welded structure that includes the mid-flange 29 and the support structure for the control rod guide frames 44. In one suitable embodiment, the control rod guide frames 44 are separate 304L stainless steel welded structures that are bolted in place, the mid-flange 29 is a SA508 Gr 4N Cl 2 carbon steel forging, and the balance of the structure is 304L stainless steel. The CRDM support structure 48 includes support lattices for the control rod drives 40, 42 and guide structure for the in-core instruments. All of these are suitably 304L stainless steel. The CRDM support structure 48 is bolted to the upper internals basket 46. These are merely illustrative materials and construction, and other configurations and/or reactor-compatible materials are also contemplated.

The illustrative example of FIG. 2 employs two types of control rod drives 40, 42: a hydraulic control rod drive type 42 that operates the shutdown rods which are either fully withdrawn or fully inserted into the core; and an electrical control rod drive type 40 that operates the gray rods which are inserted various amounts throughout the life of the core to control the nuclear reaction rate during normal reactor operation. The gray rods are also configured to scram, that is, to be rapidly inserted into the reactor core 12, during certain emergency conditions. In other embodiments, it is contemplated to omit the shutdown rods entirely in which case the gray rods also provide shutdown operation.

Figure 3:
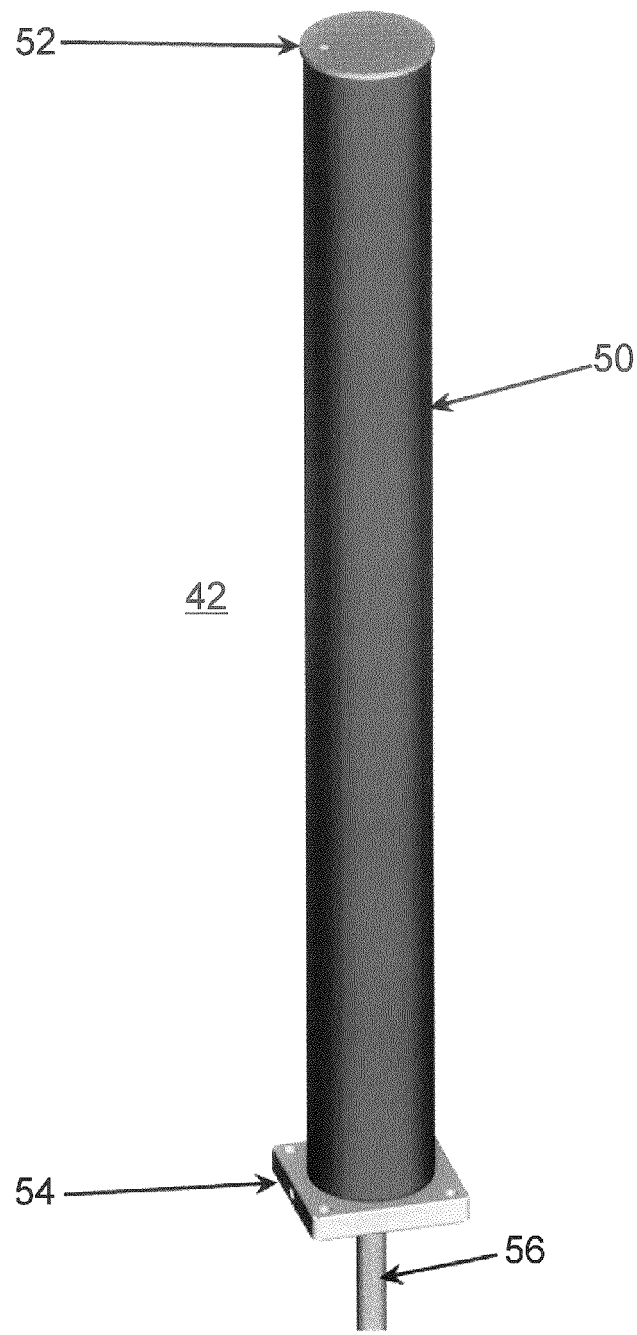
FIGS. 3-5 diagrammatically show aspects of a shutdown control rod system employing hydraulic lift.
Figure 4:
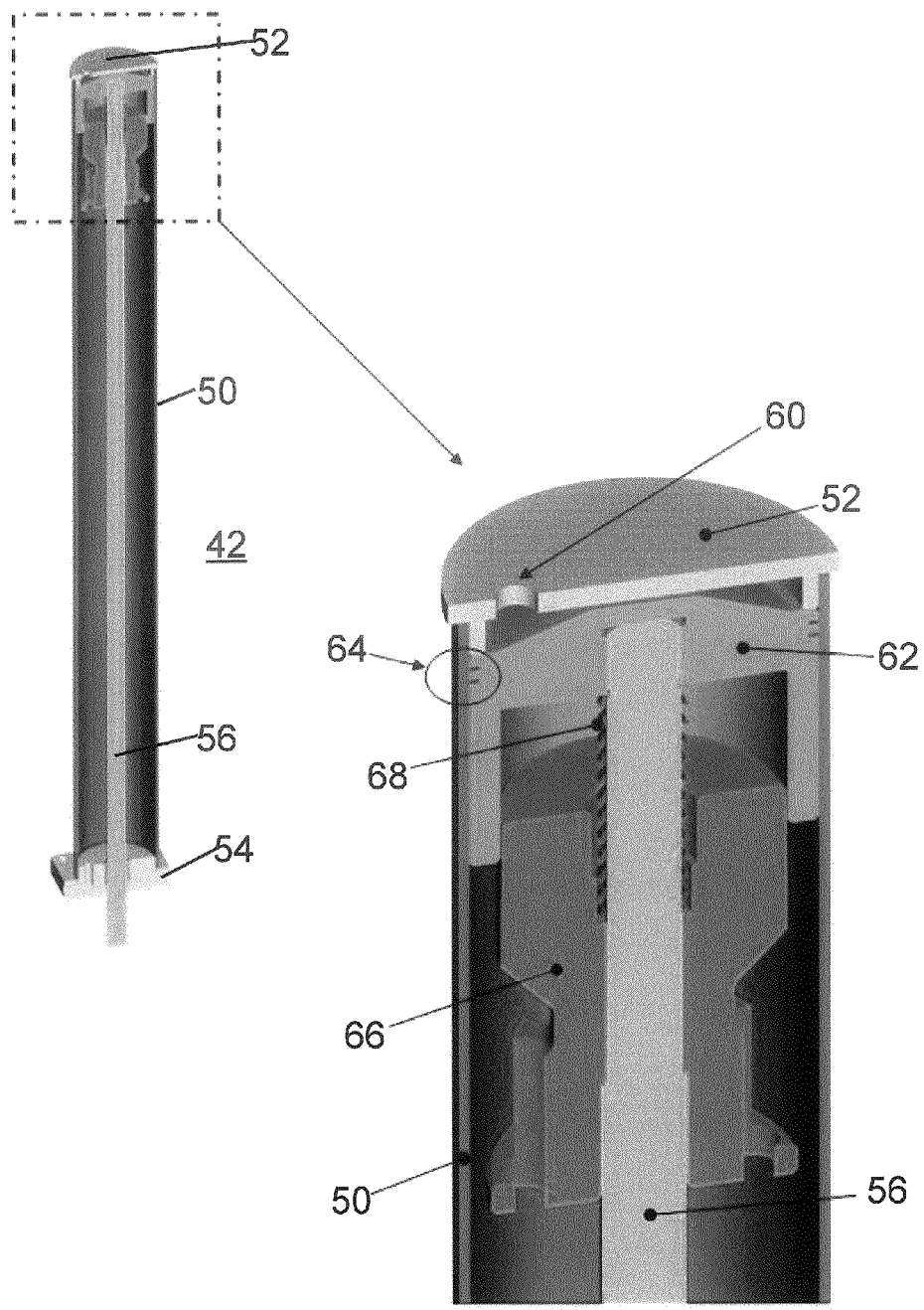
Figure 5:
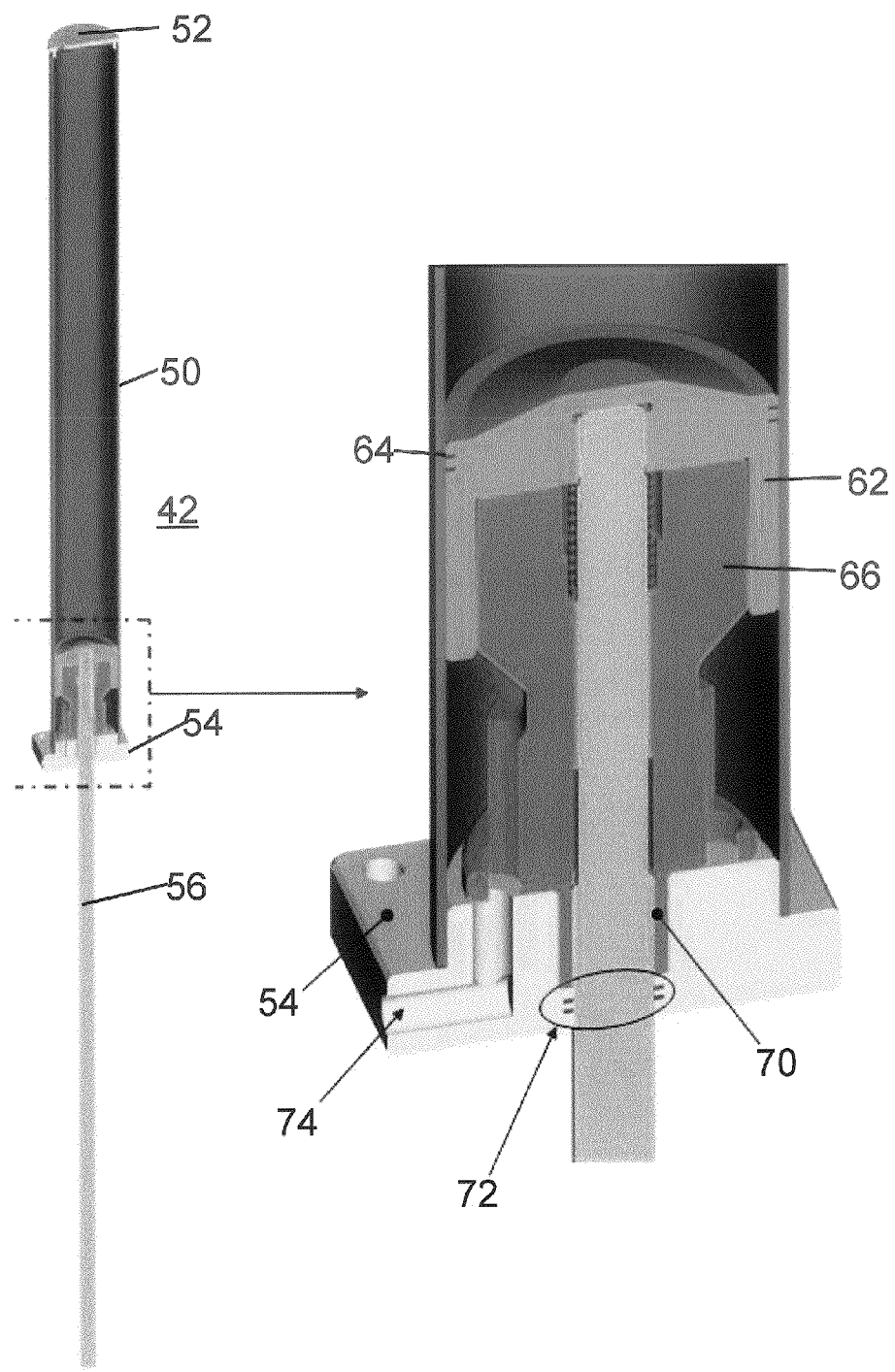

With continuing reference to FIG. 2 and with further reference to FIGS. 3-5, aspects of the shutdown rods are illustrated. The shutdown rods are suitably arranged in clusters mounted on spiders or the like that are all operated in single bank and are all moved by a single shutdown rod drive 42. FIGS. 3-5 show only the single shutdown rod drive 42, but not the spiders and individual shutdown rods. This configuration is cognizant of the fact that the shutdown rods are used in a binary "on/off" manner, and are either all wholly inserted into the reactor core 12 in order to shut down the reaction, or are all wholly withdrawn from the reactor core 12 in order to allow normal reactor operation.

With particular reference to FIG. 3, the shutdown rod drive 42 includes a cylinder housing 50, a cylinder cap 52, a cylinder base plate 54, and a connecting rod 56 providing connection to the shutdown rod lattice (not shown). The illustrative shutdown rod drive 42 of FIGS. 3-5 is a hydraulically actuated drive using reactor coolant inventory clean-up return fluid from high pressure injection pumps at approximately 500° F. (260° C.) and 1600 psi to hold the shutdown rod bank out of the reactor core 12.

With particular reference to FIG. 4, a sectional view of the piston region with the rod in the withdrawn position is shown. In an enlarged portion of FIG. 4 a vent port 60 of the cylinder cap 52 is shown, together with a lift piston 62, piston rings 64 (which in some embodiments are metallic), a scram buffer 66, and a buffer cocking spring 68. The withdrawn position shown in FIG. 4 corresponds to the shutdown control drive cylinder 42 being pressurized.

With particular reference to FIG. 5, a sectional view of the piston region with the rod in the inserted position is shown. An enlarged portion of FIG. 5 shows the lift piston 62, the piston rings 64, the scram buffer or scram buffer piston 66, a rod guide bushing 70, and rod sealing rings 72 (which in some embodiments are metallic). The cylinder base plate 54 is seen in the enlarged portion to include a pressure port or inlet port 74. The inserted position shown in FIG. 5 corresponds to the shutdown control drive cylinder 42 being unpressurized.

In some embodiments, the coolant is allowed to bleed past the piston and shaft seals 64, 72 and becomes part of the inventory returned to the reactor vessel 10. The shutdown rod drive cylinder 42 is mounted above the reactor core 12. A hydraulic line (not shown) to actuate the cylinder 42 is routed through the flange 29 and instrument lines are routed through pressure tight conduit to common connectors that are also optionally used for the gray rod drives 40. The extension rods that connect the control rod spiders to the shutdown rod lattice are optionally designed so that they will slide through the lattice so that a single stuck cluster will not prevent the other sets of control rods from dropping. Additionally, the extension rods are designed to be disengaged from the control rod spider so that the shutdown rods remain in the core when the upper internals 24 are removed. Disengagement and reengagement is done using remote tooling at during refueling operations.

During normal reactor operation, the shutdown rods are suspended completely out of the reactor core (that is, in the withdrawn position) by pressurization of the shutdown rod hydraulic cylinder 42. For example, in one suitable embodiment coolant inventory clean-up return fluid from the high pressure injection pumps is supplied at 500° F. (260° C.) and 1600 psi to the underside of the lift cylinder piston 62, via the inlet port 74 of the cylinder base 54. In this example, the fluid present in the cylinder 50 above the piston 62 is supplied from the reactor vessel 10 through the cylinder cap vent port 60, and is therefore at the reactor vessel conditions of 600° F. (315° C.) and 1500 psi, resulting in a net 100 psi pressure differential across the piston 62. Piston sizing is selected such that the developed pressure differential is sufficient to support the specified load of the shutdown rods and supporting spiders and other associated components and lift the shutdown rod bank through the cylinder stroke to the top stop of the piston 62.

In the event of a vessel-pressurized scram, the shutdown rod bank is abruptly released by ceasing the supply of pressurized coolant to the bottom side of the lift piston 62 and venting the supply line to atmospheric pressure. In the aforementioned example the vessel pressure at the top surface of the lift piston 62 is expected to create an initial 1500 psig pressure differential across the lift piston, which acts along with the influence of gravity to propel the translating assembly (including the lift piston 62, scram buffer piston 66, cocking spring 68, connecting rod 56, and shutdown rod lattice (not shown) downward toward the full insertion position illustrated in FIG. 5. During the descent of the translating assembly, the force of the buffer cocking spring 68 holds the buffer piston 66 out of the bore of the lift piston 62, preserving a fluid-filled buffer cavity between the two pistons 62, 66. When the bottom surface of the buffer piston 66 impacts the fixed base plate 54 of the cylinder assembly, the continued travel of the lift piston 62 expels the trapped fluid through controlled flow restrictions, thereby dissipating the kinetic energy of the translating assembly. Additionally, kinetic energy is dissipated through elastic deformation of the translating assembly components, especially the long, relatively slender, connecting rod 56. Other kinetic energy dissipation mechanisms are also contemplated. When the fluid is expelled from the cavity, the lift piston 62 impacts the buffer piston 66, bringing the translating assembly to rest.

Figure 6:
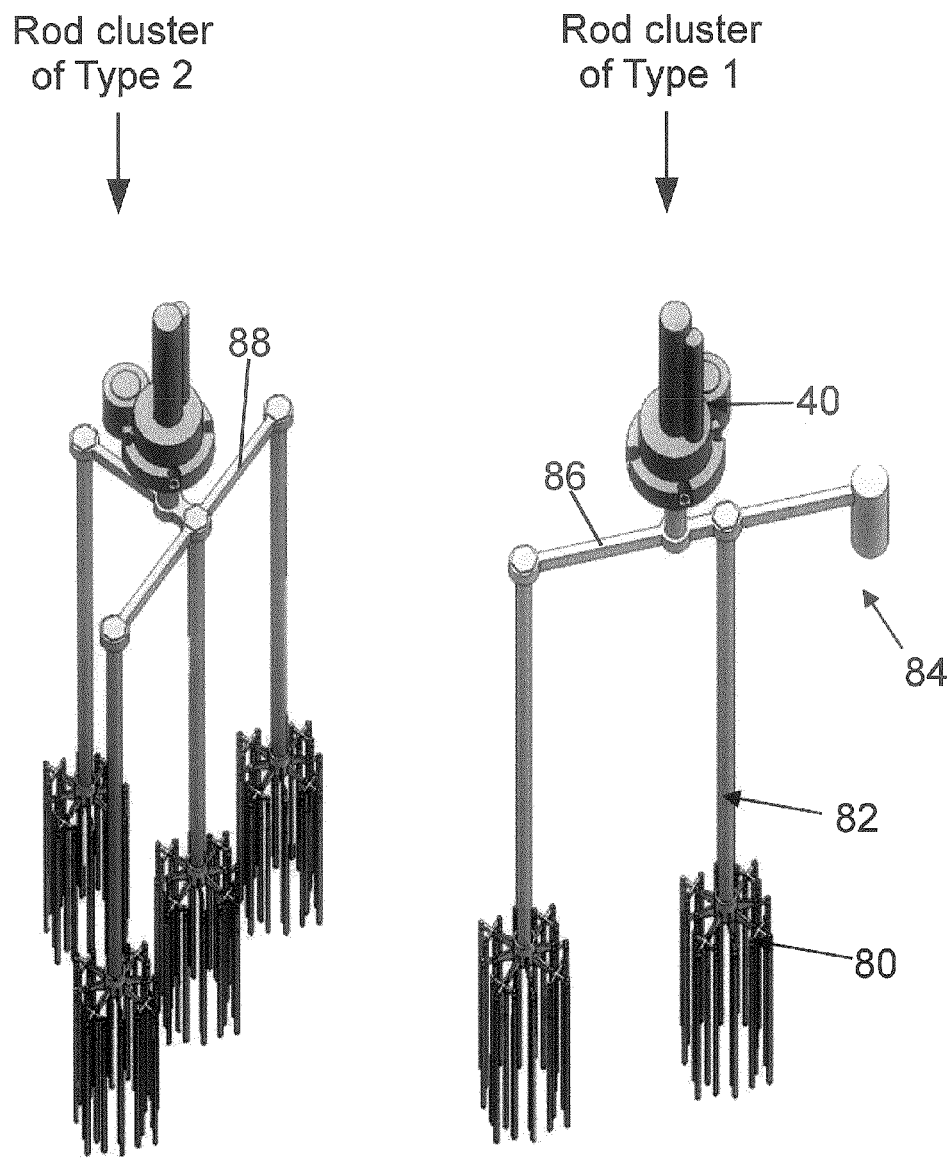
FIGS. 6-15 diagrammatically show aspects of a control rod system with electromagnetic gray rod functionality and a magnetic latch system for scram functionality.
Figure 7:
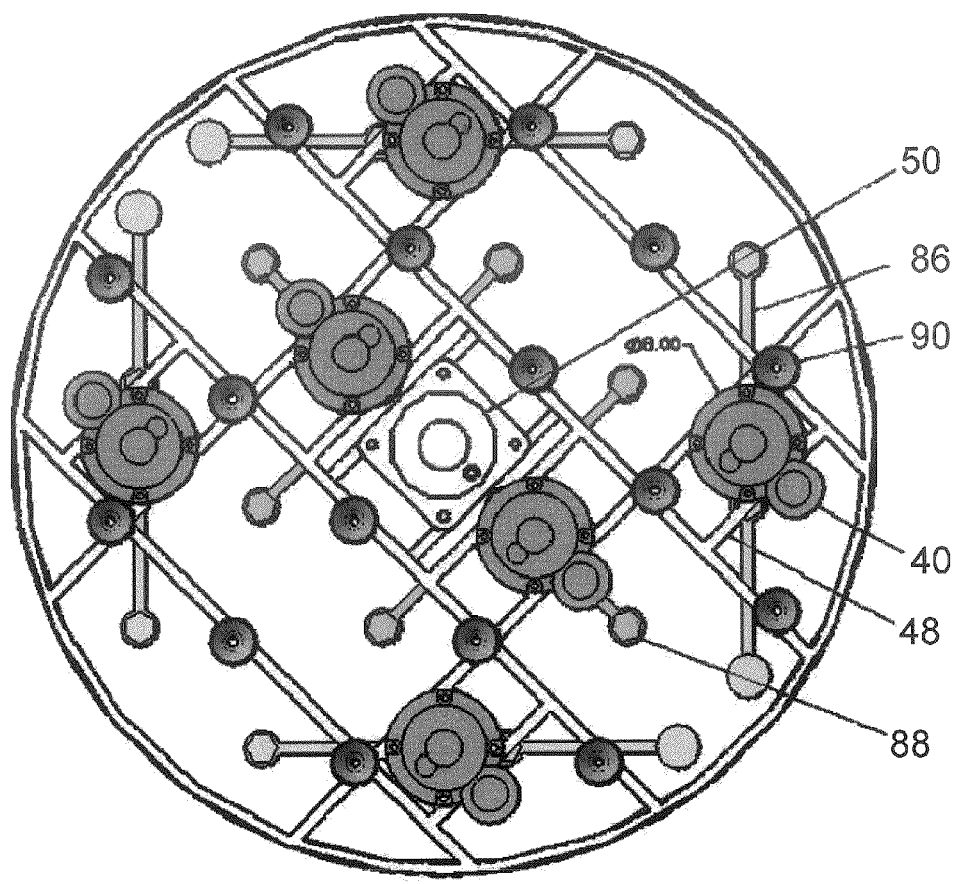

With continuing reference to FIGS. 1 and 2 and with further reference to FIGS. 6-14, an illustrative embodiment of the gray rods and associated drive mechanisms 40 is described. As seen in FIG. 6, in the illustrative embodiment there are two different gray rod configurations (Type 1 and Type 2). The gray rods 80 are arranged as gray rod clusters, which in turn are yoked together in groups of two or four and supported by connecting rods 82 as shown in FIG. 6. The configuration Type 1 also includes a counterweight 84 in place of one connecting rod/cluster unit. More particularly, a yoke 86 connects two connecting rods 82 and the counterweight 84 to form a configuration of Type 1. A yoke 88 connects three connecting rods 84 to form a configuration of Type 2. The gray rod drives 40 are mounted above the reactor core 12. FIG. 7 shows a plan view of the locations of the gray rod drives 40 and of the shutdown rods lift cylinder 50, respective to the CRDM support structure 48. The shutdown rods lift cylinder 50 is centrally located. Four outboard gray rod drives 40, each moving two rod configurations of Type 1 including yokes 86, move simultaneously. Two inboard drives 40, each moving four rod configurations of Type 2 including yokes 88, move simultaneously. These different sets of drives 40 optionally move together or independently. Power and signal connections are suitably routed through a pressure tight conduit or in-core instrumentation guide 90 to connectors on the mid-flange 29 (not shown in FIG. 7).

As with the shutdown rods, the extension rods that connect the control rod spiders to the rod lattice are optionally designed so that they will slide through the lattice so that a single stuck cluster will not prevent the other sets of control rods from dropping. Additionally, the extension rods are optionally designed to be disengaged from the control rod spider so that the gray rods can remain in the core when the upper internals are removed or be removed while the upper internals are on their support stand. Two suitable design styles for the gray rod control mechanism include the "magnetic jack" type and the "power screw" type. Of these, the power screw type is expected to provide more precise position control for the gray rod clusters, and accordingly the illustrated embodiment employs the power screw type control mechanism.

Figure 8:
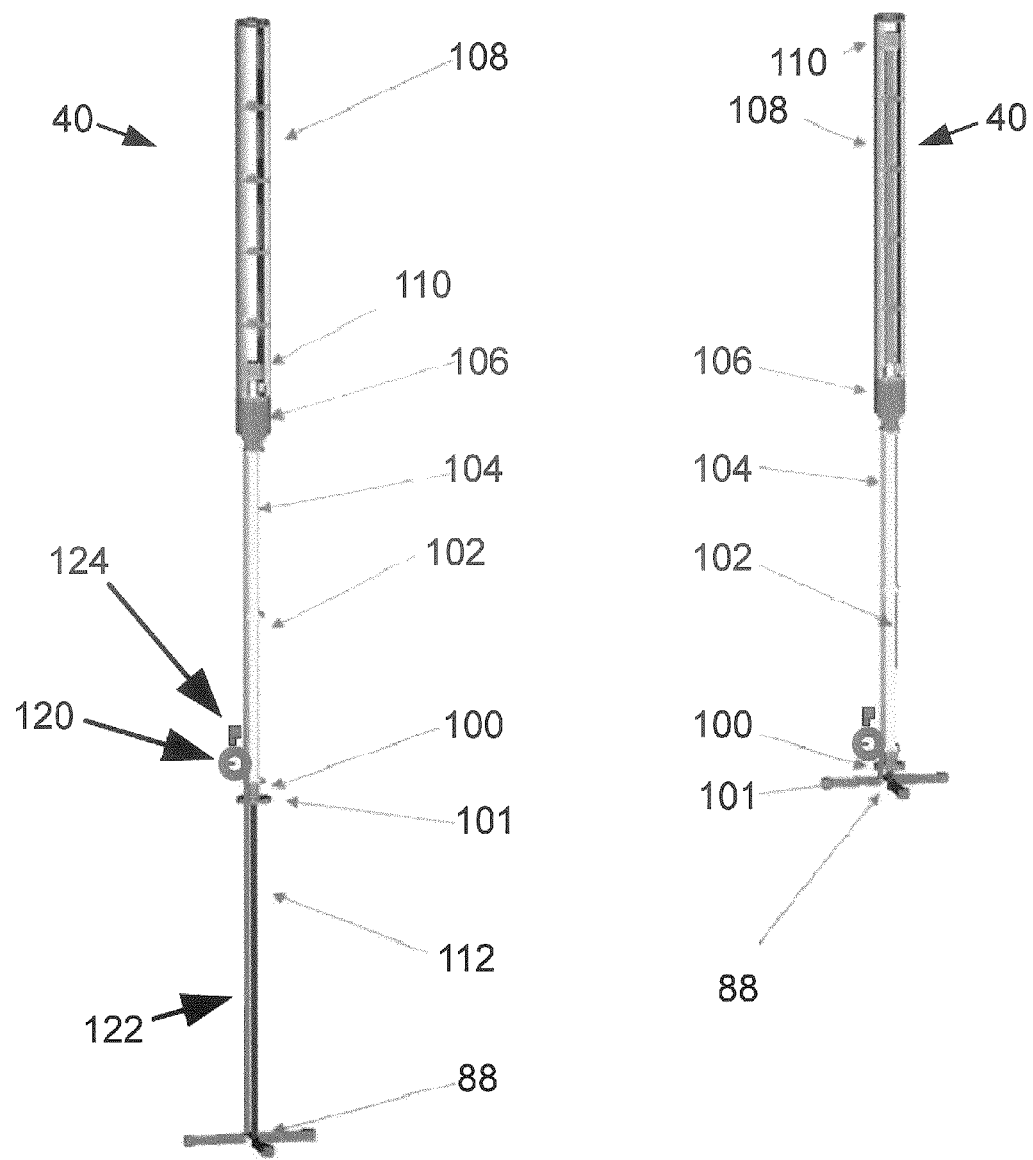

With reference to FIG. 8, in one illustrated embodiment the gray rod control mechanism 40 employs a ball nut lifting rod configuration. FIG. 8 shows both the fully inserted state (left-side drawing) and fully withdrawn state (right-side drawing). The drawings of FIG. 8 show the yoke 88 of the Type 2 configuration; for the Type 1 arrangement the yoke 88 is replaced by the yoke 86. In the embodiment shown in FIG. 8, a bottom stop/buffer assembly 100 is mounted on a reactor support 101, optionally with additional lateral support provided for the electromagnet coil assembly. Lower and upper support tubes 102, 104, which mount to the top of the bottom stop 100, provide the guidance for the lead screw/torque taker assembly. A ball nut/motor assembly 106 mounts on top of the upper support tube 104 and an electromagnet coil assembly 108 mounts to the top of the motor. Within the electromagnet coil assembly 108 resides a lifting rod-to-lead screw latching assembly 110 that (when latched) supports a lifting/connection rod assembly 112 (seen extended in the inserted state, i.e. left-side drawing).

A position indicator assembly is mounted to the support tubes 102, 104 between the ball nut/motor assembly 106 and the bottom stop assembly 100. In some embodiments, the position indicator is a string potentiometer suitably mounted below the latching assembly 110, although other mounting locations are contemplated. The illustrated string potentiometer includes a tensioned spool 120 mounted on the support tube 102 and a "string" or cable or the like 122 having an end attached to the lifting/connection rod assembly 112 such that the string or cable 122 is drawn off the spool 120 against the tension as the lifting/connection rod assembly 112 (and, hence the attached gray rod clusters) move toward the reactor core 12 (not shown in FIG. 8). When the motion is reversed, the tension in the tensioned spool 120 causes the string or cable 122 to roll back onto the spool 120. A rotational sensor 124 measures the rotation of the tensioned spool 120 using an encoder that counts passage of fiducial markers or another rotational metric. The mounting of the string potentiometer can be otherwise than that illustrated, so long as the tensioned spool 120 is mounted at a location that does not move with the gray rods and the string or cable 122 is secured to move with the gray rods. It is also contemplated to integrate the rotational sensor 124 with the tensioned spool 120. The string potentiometer provides an electrical output signal consistent with the location of the connecting rod or other component 112 that moves with the gray control rod, thus providing positional information for the gray control rods within the reactor core 12. The electrical position indication signal is conveyed out of the reactor vessel 10 through an electrical feedthrough (not shown), which can be made small and/or integrated with other electrical feedthroughs. The position indicator device is configured and calibrated for operation at reactor vessel temperature and radiation level.

Figure 9:
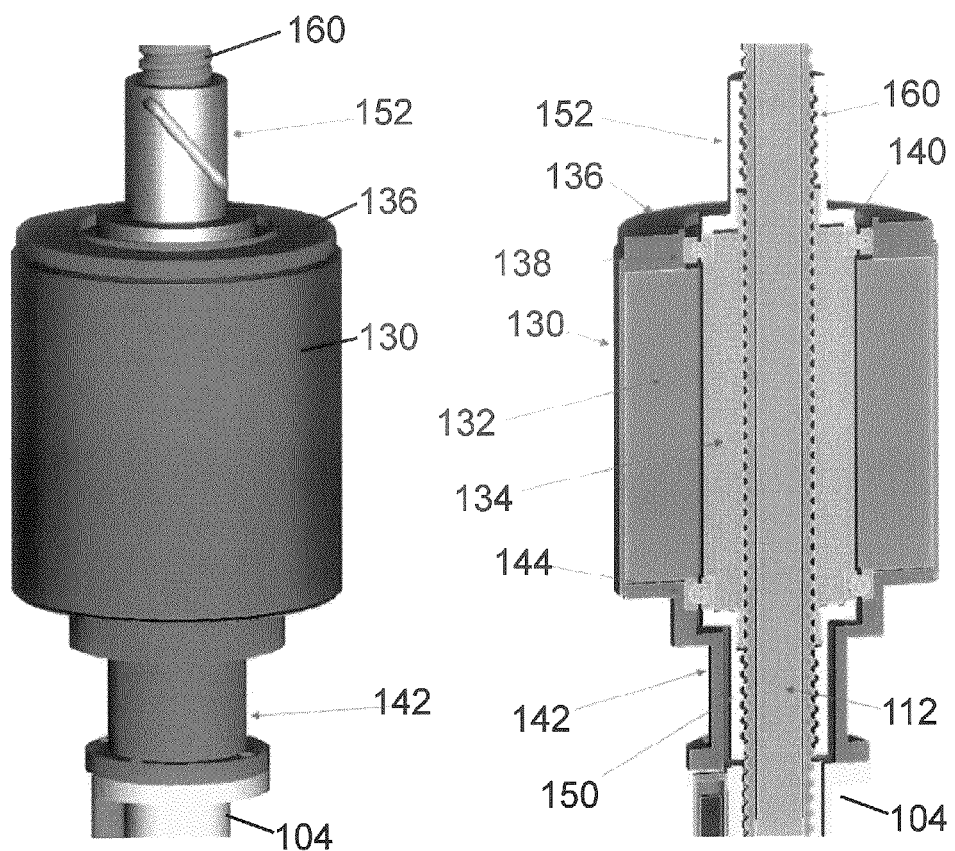

With continuing reference to FIG. 8 and with further reference to FIGS. 9-14, in the illustrated embodiment the translating assembly of the gray rod CRDM 40 includes three elements: a lead screw/torque taker assembly; a lifting rod/connecting rod assembly; and a latching system that operatively connects the lifting rod with the lead screw. FIG. 9 shows the lead screw/torque taker assembly in perspective (left side) and sectional (right side) views. A motor assembly includes a stator housing 130 housing a stator 132 and a rotor 134. An upper stator end plate 136 and a radial bearing 138 with adjustable spacer 140 complete an upper portion of the motor assembly, while a lower housing 142 and a thrust bearing 144 complete a lower portion of the motor assembly. A lower ball-nut assembly 150 disposed within the lower housing 142 is threaded to the rotor 134, and an upper ball nut assembly 152 is also threaded to the rotor 134. Both ball-nut assemblies 150, 152 are coupled in threaded fashion with a lead screw 160 (shown in part in FIG. 9). FIG. 9 further shows portions of the lifting rod 112 and the upper support tube 104.

Figure 10:
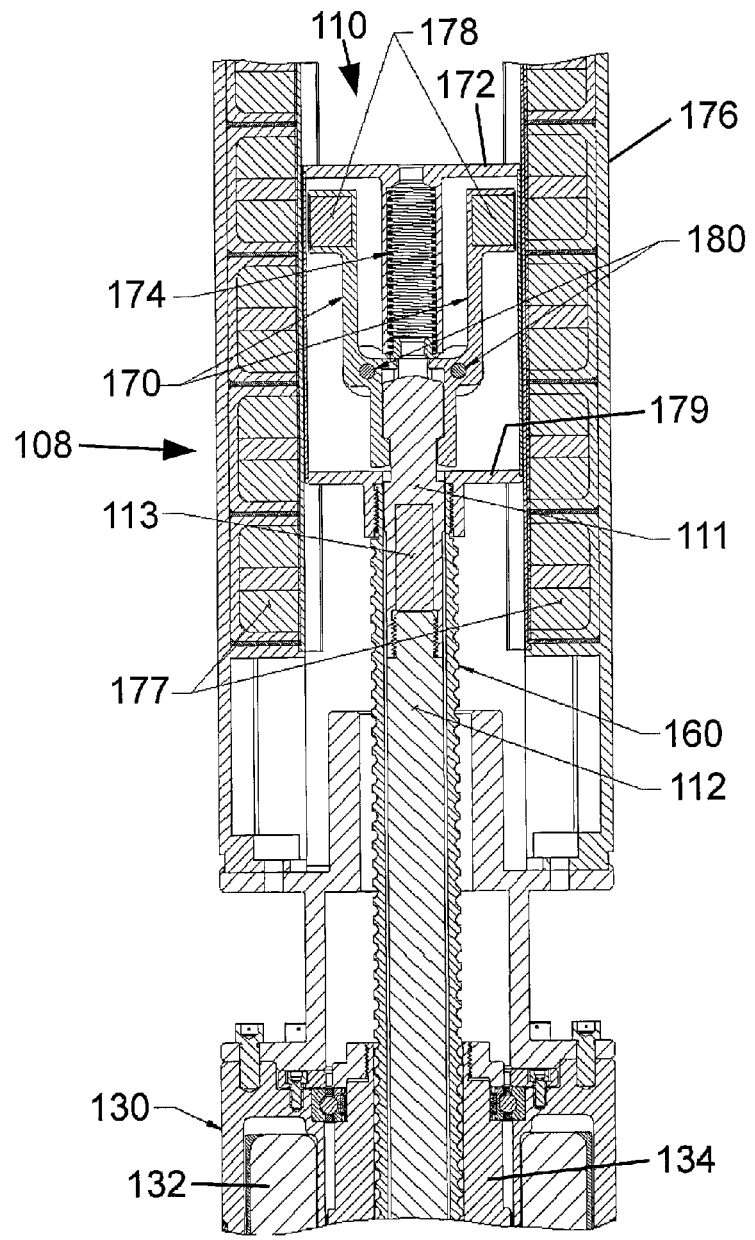

With reference to FIG. 10, the latching system is illustrated, including the lifting rod-to-lead screw latching assembly 110 and a portion of the electromagnet coil assembly 108. Also shown in FIG. 10 are an end 111 of the lifting rod 112 and a proximate end of the lead screw 160 terminating at or in the latching assembly 110. Latches 170 directly connect the top end 111 of the lifting rod 112 to the lead screw 160 for normal operation, and disconnect the lifting rod 112 during scram (see FIG. 11). The bottom of the lifting rod 112 is threaded to the top of the connecting rod 82 (optionally by the intermediary yoke 86 or intermediary yoke 88) thereby creating a continuous lifting rod/connecting rod assembly. The bottom of the connecting rod 82 couples directly to the control rod spiders thereby attaching the control rods to the mechanism. Optionally, a magnet 113 is disposed proximate to the top 111 of the lifting rod 112 to provide a magnetic signal for a magnetically-based position indicator (see FIG. 21). FIG. 10 also shows a portion of the motor including portions of the motor housing 130, stator 132, and rotor 134, which is shown in full in FIG. 9.

The latches 170 are housed in a latch housing 172 that includes a spring guide for a latch spring 174. Additional components of the illustrated latching system embodiment include an electromagnet housing 176 housing electromagnets 177 forming an electromagnet coil stack, and permanent magnets 178 on the latches 170. The lead screw 160 is threaded into a latching system base 179 of the latch housing 172. The latches 170 are arranged to pivot about pivot locations 180 to provide a failsafe scram due to downward rod load.

In this embodiment, the lead screw 160 is continuously supported by a ball nut motor assembly (best seen in FIG. 9) which allows for very fine control of lead screw position and consequently very fine control of the position of the control rod assembly. In the illustrated embodiment, the motor (e.g., stator 132, rotor 134) is a synchronous motor in which the rotor 134 is a permanent magnet. This design has advantages such as compactness and simplicity; however, other motor configurations are also contemplated.

The lead screw 160 does not scram. Instead, during a scram the top end of the lifting rod 112 of the lifting rod/connection rod assembly is disconnected from the lead screw 160 by the magnetically activated latching system (see FIG. 11). When power is cut to the electromagnets 177 the failsafe latching system releases the lifting/connection rod assembly (and thus the control rod assembly) from the lead screw 160 thereby initiating a scram. A bottom stop and buffering system (not illustrated, but suitably similar to the bottom stop and buffering system of the illustrative shutdown rods described herein with reference to FIGS. 4 and 5) is incorporated into the base/buffer assembly to dissipate the kinetic energy at the end of the scram stroke and to set the rod bottom elevation. A torque taker (not shown) is attached to the lead screw 160 to react the motor torque thereby providing translation of the lead screw/control rod assembly.

The normal state, that is, the state prior to scram, is shown in FIGS. 9 and 10. FIG. 9 illustrates the ball nut motor assembly and FIG. 10 shows the latching system engaged for normal operation. As seen in FIG. 10, the permanent magnets 178 on the latches 170 are magnetically attracted toward the powered electromagnets 177 thus pivoting the latches 170 about the pivot locations 180 and engaging the latches 170 with a mating region of the lifting rod 112. Thus, the latches 170 are secured with the lifting rod 112 in the normal state shown in FIG. 10. Further, the latching system base 179 is threaded to or otherwise secured with the lead screw 160. Accordingly, in the normal state of FIG. 10 the lifting rod 112 is secured with the lead screw 160 via the latching system, and so as the ball nut motor assembly shown in FIG. 9 translates the lead screw 160 the lifting rod 112 is translated with the lead screw 160.

Scram is described with reference to FIG. 11, which shows the lifting rod 112, and consequently the control rod assembly, during a scram. To initiate scram the power to the electromagnets 177 is cut, that is, turned off. This removes the attractive force on the permanent magnets 178 on the latches 170, and the latch spring 174 extends to pivot the latches 170 about the pivot locations 180 and away from the mating region of the lifting rod 112. This disengages the latches 170 from the lifting rod 112, and the lifting/connection rod assembly (and thus the control rod assembly) falls toward the reactor 12. The lead screw 160 is seen in FIG. 11 still at the previous withdrawal height (that is, the lead screw 160 is not scrammed), but power to the electromagnet coils 177 has been cut so that the magnetic field from the coils is removed.

Figure 11:
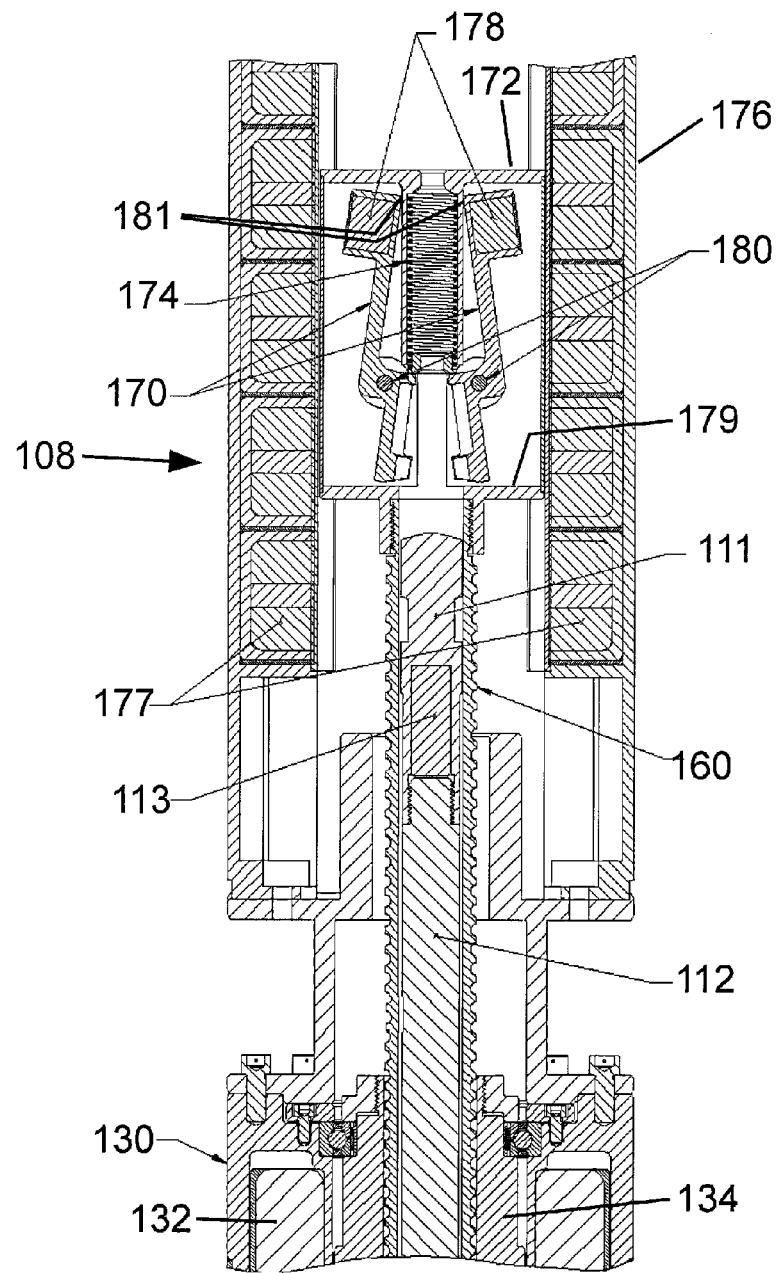

As further shown in FIG. 11, the pivoting of the latches 170 about the pivot locations 180 is stopped by impingement at a location 181 with the spring guide of the latch housing 172.

Figure 12:
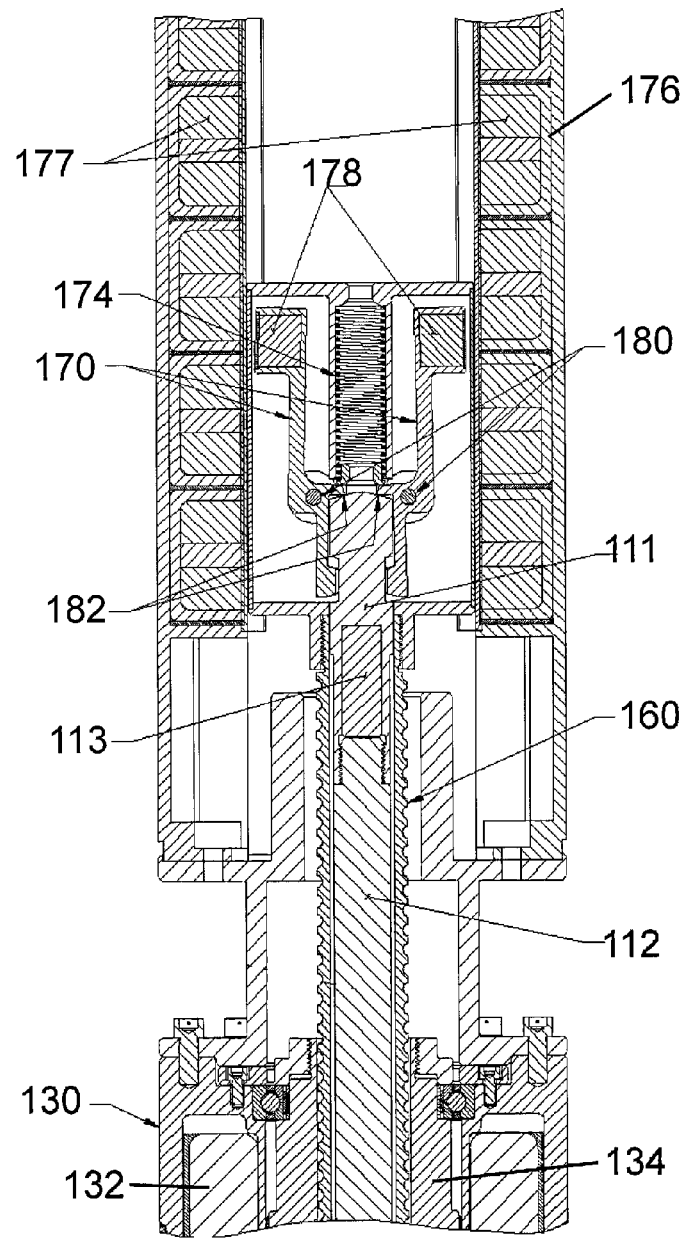
Figure 13:
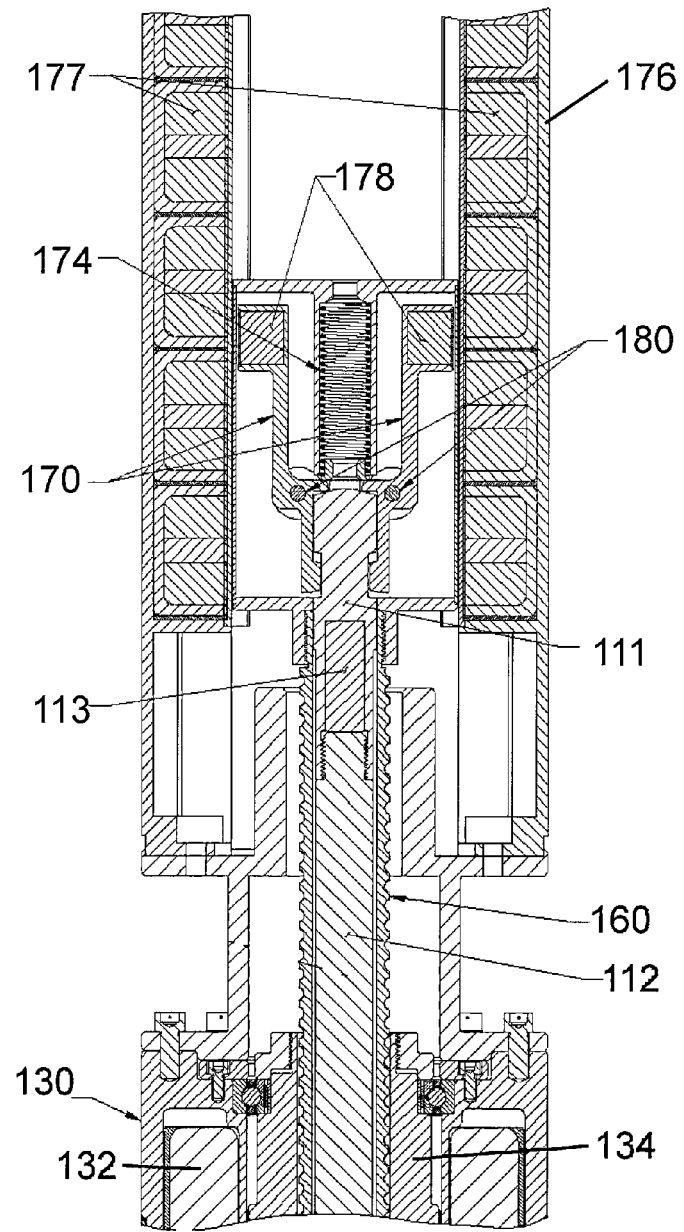

With continuing reference to FIG. 11 and further reference to FIGS. 12 and 13, to re-engage the mechanism after a scram, the lead screw 160 is driven to the fully inserted position via the ball nut motor (see again FIG. 9). A lead screw on-bottom sensor is used to confirm lead screw full insertion. With particular reference to FIG. 12, as the lead screw 160 nears the fully inserted position an angled camming surface 182 on the top 111 of the lifting rod 112, which is scrammed to the bottom, will cam the latches 170 to their near full out position. With particular reference to FIG. 13, when power is restored to the electromagnets 177, the latches 170 will fully re-engage with the mating region of the lifting rod 112 so that the lifting/connection rod assembly is once again connected to the lead screw 160. Normal operation can then resume as per FIG. 10. To reiterate, FIG. 12 shows the lead screw 160 being driven back down to the fully inserted position in preparation for re-engagement of the lifting rod 112. Power to the electromagnet coils 177 is still cut and the latches 160 are still disengaged. The angled camming surfaces 182 on the top 111 of the lifting rod 112 are camming the latches 170 back into partial engagement with the top 111 of the lifting rod 112. FIG. 13 shows the lead screw 160 still on bottom but with the power restored to the electromagnet coils 177. The restored magnet field has now re-engaged the latches 170 with the mating region of the lifting rod 112.

FIG. 9 diagrammatically shows a suitable embodiment of the ball nut/motor assembly 106, including lower and upper ball nut assemblies 150, 152. In general, substantially any type of motor can be used, suitably configured for operation in the pressure vessel environment.

Figure 14:
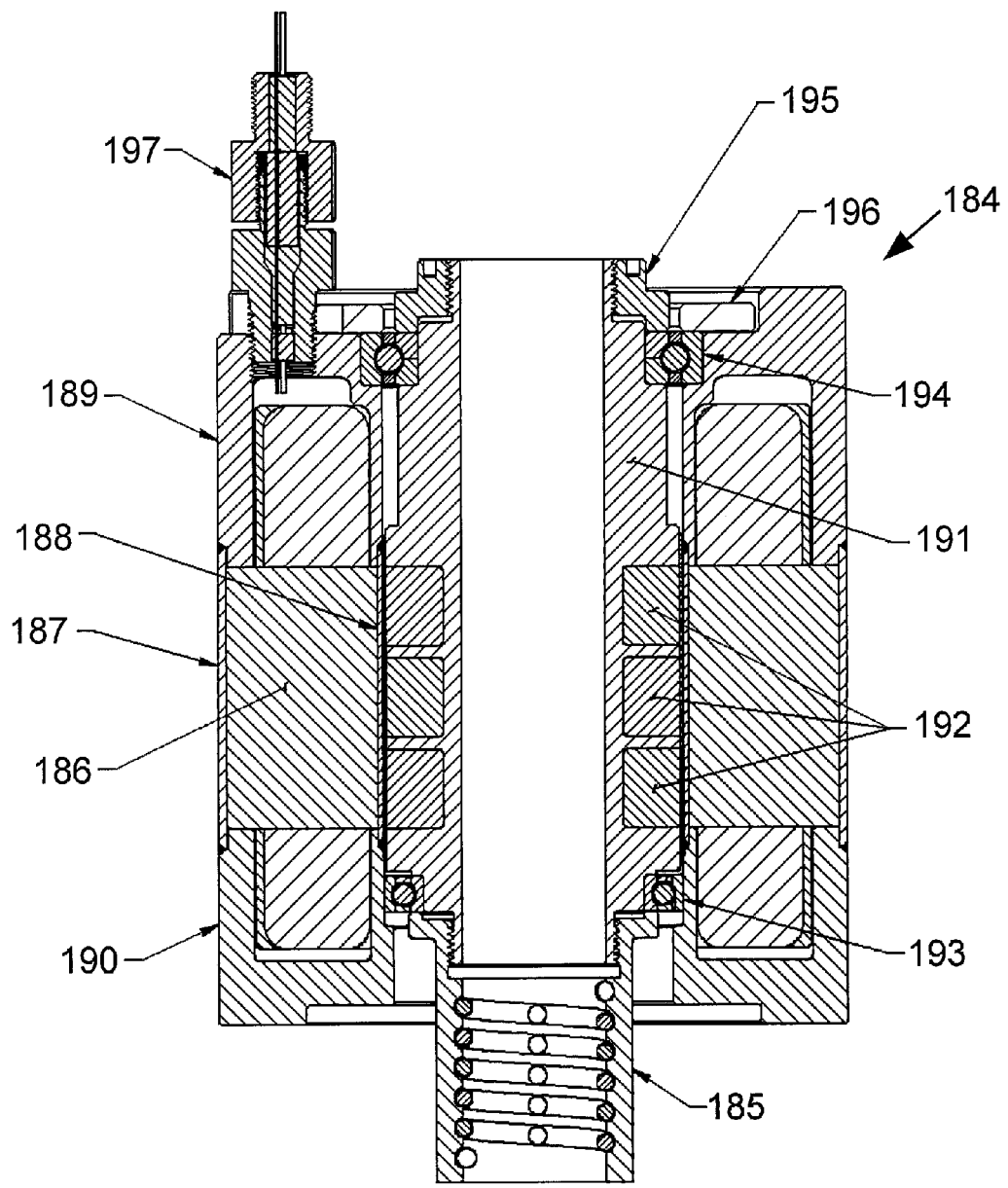
Figure 15:
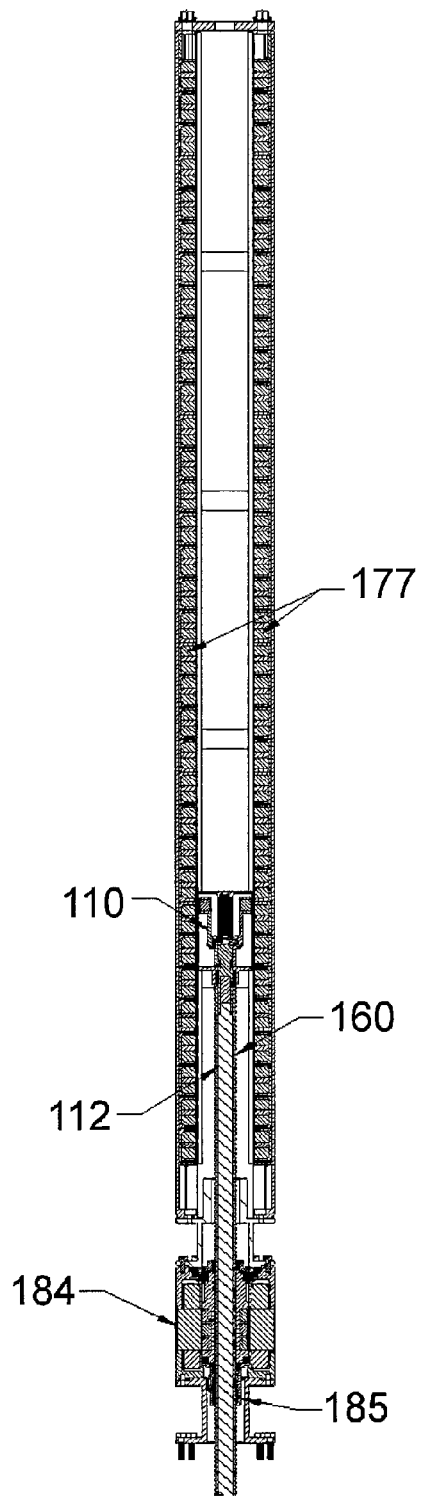

With reference to FIGS. 14 and 15, an illustrative embodiment is shown which employs a brushless DC electronically controlled (BLDC) motor 184 with lower ball nut assembly 185. The assembly 184, 185 is an illustrative embodiment of the ball nut/motor assembly 106. With particular reference to FIG. 14, the illustrative BLDC motor 184 includes a wound stator core assembly 186 disposed between a stator outer shell 187 and a stator inner shell 188 and secured by a stator upper housing 189 and stator lower housing 190. A permanent magnet rotor 191 includes permanent magnets 192. The BLDC motor 184 produces torque from interaction of magnetic flux of the rotor magnets 192 and the current carrying stator conductors of the stator core assembly 186. The lower ball nut assembly 185 is analogous to the lower ball-nut assembly 150 of FIG. 9; however, in the illustrative assembly of FIG. 14 there is no upper ball-nut assembly corresponding to the upper ball nut assembly 152 of FIG. 9. The assembly of FIG. 14 also includes a radial bearing 193, a thrust bearing 194 secured by a thrust bearing lock nut 195, and a motor top cap 196. An insulated and environmentally robust electrical connection to the motor is provided by a lead wire gland 197. For example, some suitable insulated lead wire glands are available from Conax® Technologies (Buffalo, N.Y., USA). With particular reference to FIG. 15, the BLDC motor 184 and lower ball-nut assembly 185 are illustrated in the context of the control rod drive mechanism (CRDM) of FIGS. 10-13. The illustrative CRDM of FIG. 15 also includes the previously described electromagnet coil stack assembly 177, lifting rod-to-lead screw latching assembly 110, lead screw 160, and lifting rod 112. The ball-nut assembly 185 engages the lead screw 160 so that, as the motor 184 rotates the permanent magnet rotor 191 and the secured ball-nut assembly 185, the lead screw 160 is driven linearly.

With returning reference to FIGS. 1 and 2, an advantage of the disclosed reactor design is that the middle section includes the internals support flange or "mid-flange" 29. This section can be made relatively thin, and provides support for the control rod drive mechanism and guides for the in-core instrumentation. This section provides electrical and hydraulic inputs for the control rod drive mechanisms (CRDMs). A reactor coolant drain penetration (not illustrated) is optionally also incorporated in this section. This drain line, if incorporated, is optionally isolated by an internal valve whenever the reactor is pressurized to limit or eliminate its potential as a loss of coolant accident (LOCA) site.

The illustrated upper internals 24 including the CRDM do not include illustrated thermal insulation. However, it is contemplated to insulate these components using an insulation system capable of withstanding a design temperature of at least about 650° F. (343° C.). By using the insulation system, external cooling water will not be required although may optionally also be used. For example, cooling water can be supplied to the electrical devices to reduce the severity of the heat duty imposed by the operating environment. The insulation system facilitates locating the electrical CRDM within the pressure vessel, which reduces the overall height of the reactor vessel 10, significantly reduces the number of penetrations into the reactor vessel 10, and enables a complete reactor module to be shipped as a single unit. Another advantage is reduction of the overall height of the containment structure (not shown). Although the use of insulation is believed to be advantageous, other contemplated solutions include the use of water cooling and/or selecting materials capable of withstanding the high operating temperature without insulation.

The illustrative reactor embodiment is an integral pressurized water reactor (PWR) configuration. However, one or more of the disclosed techniques, apparatuses, or so forth are also expected to be suitably used in other types of nuclear reactor vessels, such as boiling water reactors (BWRs) that can advantageously incorporate internal CRDM assemblies, efficient control rod position sensors, and so forth.

The CDRM configuration of FIGS. 2-15 provides two separate scram mechanisms: a hydraulic scram provided by the shutdown rods described with reference to FIGS. 3-5; and a magnetic latch scram mechanism described with reference to FIGS. 6-15 with the magnetic latch system described with particular reference to FIGS. 10-15. This advantageously provides redundant hydraulic and magnetic scram mechanisms thus reducing likelihood of a complete scram failure in the event of a loss of coolant accident (LOCA) or other safety-related event.

With reference to FIGS. 16-20, in another control rod system embodiment is described, which provides electromagnetic gray rod functionality and a hydraulic latch system providing scram functionality. Like the control rod system of FIGS. 6-15, the control rod system of FIGS. 16-20 allows for failsafe scram of the control rod cluster without scramming the lead screw.

Figure 16:
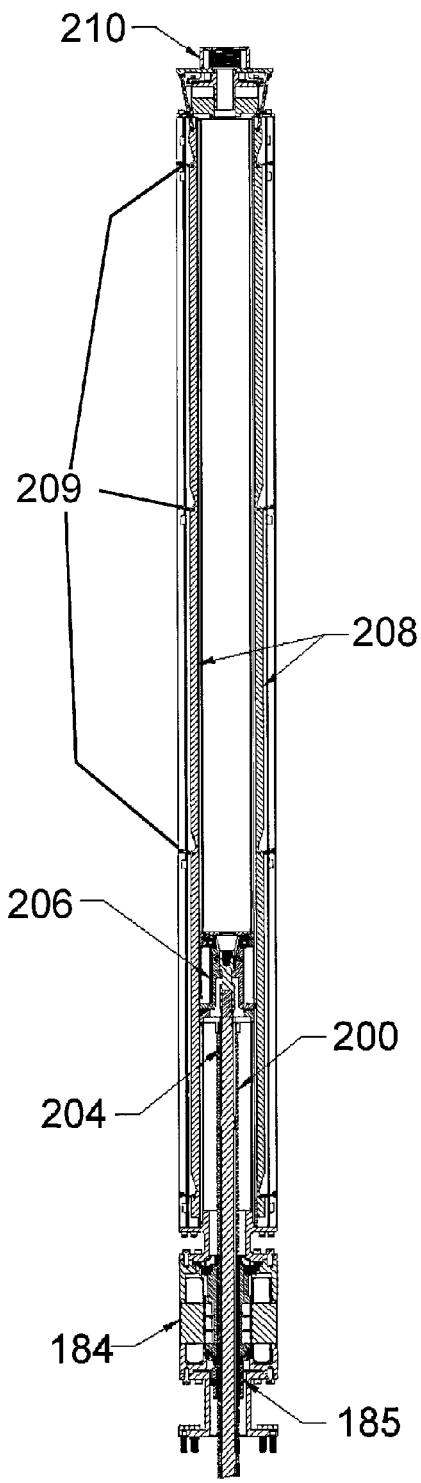
FIGS. 16-21 diagrammatically show aspects of a control rod system with electromagnetic gray rod functionality and a latch system driven by a hydraulic lift for scram functionality.

With particular reference to FIG. 16, the motor/ball nut assembly of FIG. 15 is employed, such that a lead screw 200 is permanently engaged to the ball-nut assembly 185 which provides for axial translation of the lead screw 200 by driving the motor 184. A control rod cluster (not shown in FIG. 16) is connected to the lead screw 200 via a connecting rod or connecting rod assembly 204 and a latch assembly 206. The lead screw 200 is substantially hollow, and the connecting rod assembly 204 fits coaxially inside the inner diameter of the lead screw 200 and is free to translate vertically within the lead screw 200. The latch assembly 206, with two spring loaded latches, is permanently attached to the top of the lead screw 200. When the latches are engaged with the connecting rod 204 they couple the connecting rod 204 to the lead screw 200 and when the latches are disengaged they release the connecting rod 204 from the lead screw. In the illustrated embodiment, latch engagements and disengagements are achieved by using a four-bar linkage cam system including two cam bars 208 and at least two (and, in the illustrated embodiment four) cam bar links 209 per cam bar 208. The additional cam bar links add support for the cam bar. When the cam bars 208 move upward the cam bar links 209 of the four-bar linkage also cams the cam bars 208 inward so as to cause the latches to rotate into engagement with the connecting rod 204. In the illustrated embodiment, a hydraulic lift assembly 210 is used to raise the cam bar assemblies 208. In an alternative embodiment (not illustrated), an electric solenoid lift system is used to raise the cam bar assemblies. When a lift force is applied to the cam system, the upward and inwardly-cammed motion of the cam bars 208 rotates the latches into engagement thereby coupling the connecting rod 204 to the lead screw 200. This causes the control rod cluster to follow lead screw motion. When the lift force is removed, the cam bars 208 swing down and are cammed outward by the cam bar links 209 of the four-bar linkage allowing the latches to rotate out of engagement with the connecting rod 204. This de-couples the connecting rod 204 from the lead screw 200 which causes the control rod cluster to scram. During a scram, the lead screw 200 remains at its current hold position. After the scram event, the lead screw 200 is driven to the bottom of its stroke via the electric motor 202. When the lift force is reapplied to the cam system via the hydraulic lift assembly 210, the latches are re-engaged and the connecting rod is re-coupled to the lead screw 200, and normal operation can resume. Still further, other latch drive modalities are contemplated, such as a pneumatic latch drive in which pneumatic pressure replaces hydraulic pressure in the illustrated lift assembly 210.

With continuing reference to FIG. 16, the lead screw 200 is arbitrarily depicted in a partially withdrawn position for illustration purposes. It can be seen in FIG. 16 that the latching assembly 206 is attached to the top of the lead screw 200. In FIG. 16 the latches are engaged the connecting rod 204, which is coupled to the lead screw, is also at the same partially withdrawn position as the lead screw 200. The ball nut 185 and motor 184 are at the bottom of the control rod drive mechanism (CDRM), the latch cam bars 208 extend for the full length of mechanism stroke, and the hydraulic lift system 210 is located at the top of the mechanism. In some embodiments, the CRDM of FIGS. 16-20 is an integral CDRM in which the entire mechanism, including the electric motor 184 and ball nut 185, the latching system 206, and a position indicator (not shown in FIG. 16), are located within the reactor pressure vessel 10 at full operating temperature and pressure conditions.

Figure 17:
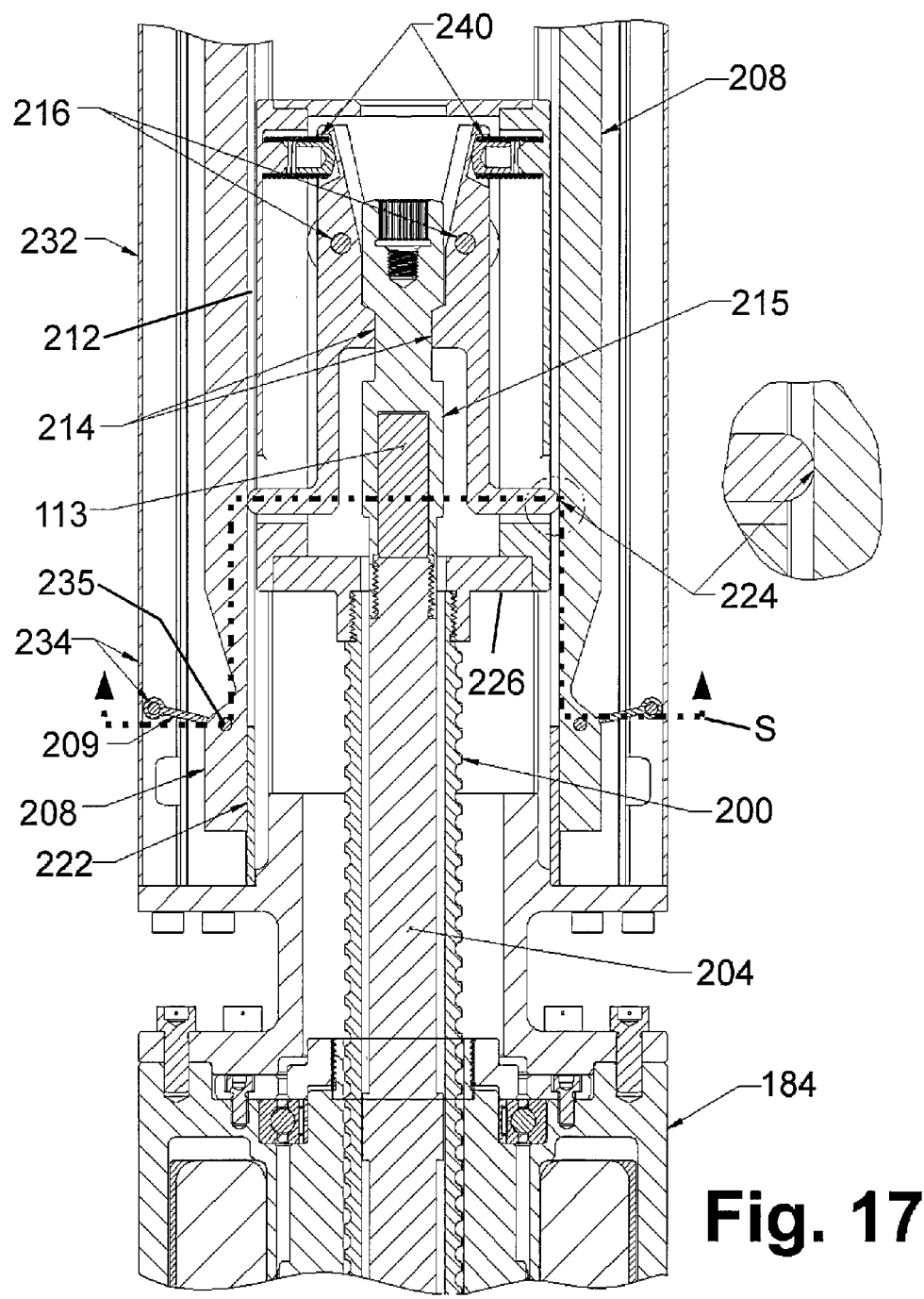
Figure 18:
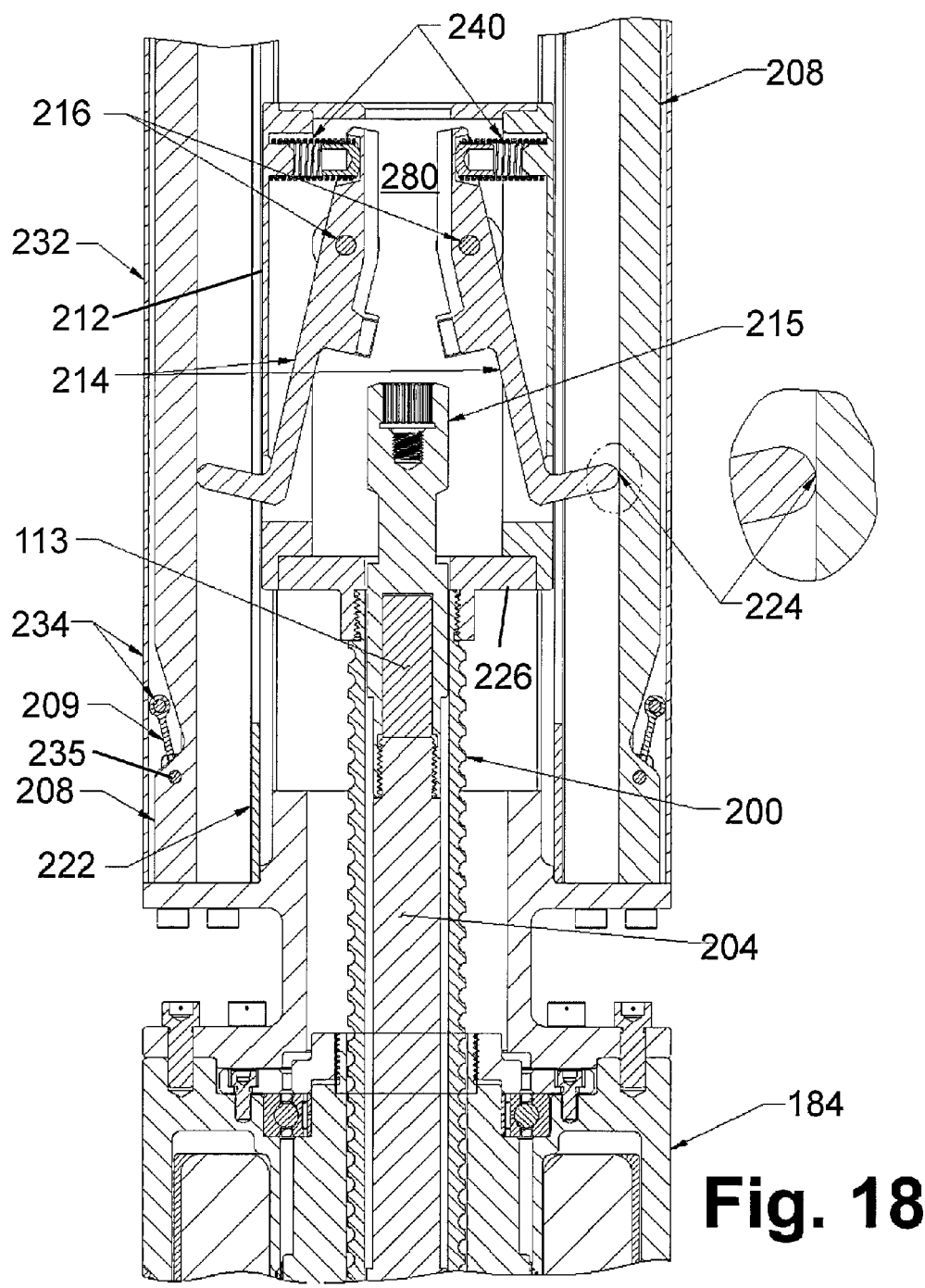

With reference to FIGS. 17 and 18, the lower end of the control rod drive mechanism (CRDM) including the latching assembly 206 is illustrated in additional detail. The latching assembly 206 includes a latch housing 212 and latches 214. The latch housing 212 provides a frame or support for pivot positions 216 (e.g., pivot pins or rods) about which the latches 214 can pivot. In FIG. 16, the connecting rod 204 is withdrawn, that is, latches 214 of the latching assembly 206 are pivoted inwardly into engagement with mating region at an upper end 215 of the connecting rod 204. In the illustrative embodiment, the top of the connecting rod 204 includes the optional magnet 113 to provide a magnetic signal for a magnetically-based position indicator (see FIG. 21). FIG. 17 shows the connecting rod 204 scrammed, that is, latches 214 are pivoted outwardly so as to be disengaged from the mating region at the upper end 215 of the connecting rod 204 so that the connecting rod 204 is mechanically decoupled from the lead screw 200 and is free to move within the inner diameter of the lead screw 200. Thus decoupled as shown in FIG. 17, the connecting rod 204 (and hence the control rod bundle or bundles secured to the connecting rod 204) fall toward the reactor core 12 under the influence of gravity. In both FIGS. 16 and 17, the lead screw 200 is again shown slightly withdrawn to an arbitrarily position—as seen in FIG. 17 the lead screw 200 does not scram.

Referring particularly to FIG. 17, the two cam bars 208 are shown raised at their maximum inward (that is, engaged) position. The inward movement of the cam bars 208 caused by the cam bar links 209 rotates or pivots the latches 214 inward into full engagement with the mating region at the upper end 215 of the connecting rod 204. When moved inward to full engagement, the cam bars 208 are supported along their full length by a cam bar housing cover 222 which provides a positive stop for the inward movement of the cam bars 208. The cam bar housing cover 222 is slotted down its center for the full mechanism stroke length to allow latch fingers 224 or other outward extensions of the latches 214 to pass through the cam bar housing cover 222 and contact the cam bars 208 at any withdrawal position of the lead screw 200.

In the illustrative embodiment, there are two latches 214 and two cam bars 208, one per latch. However, other numbers of latches and cam bars are contemplated—as another example, there can be four latches and four corresponding cam bars spaced at 90° intervals around the central axis of the lead screw 200/connecting rod 204. The illustrated two cam bars 208 drive a corresponding two latches 214 in a two-fold rotationally symmetric arrangement respective to the central axis of the lead screw 200/connecting rod 204. Again, more generally, it is contemplated for the number of cam bars/latches to be greater than two, with the number of cam bars/latches being selected and arranged to provide balanced latching support for the connecting rod 204.

The lower portions of FIGS. 17 and 18 also show an upper portion of the motor 184, whose details are described with reference to FIG. 14 herein. Again, the illustrative motor 184 is merely an illustrative example, and various types of motors can be employed, such as the illustrative brushless DC electronically controlled (BLDC) motor 184 with a wound stator core and a permanent magnet rotor which produces torque from interaction of magnetic flux and the current carrying stator conductors, or a variable reluctance stepper motor (VRS) having a wound stator core and a laminated steel rotor which produces torque from the variation in reluctance as a function of rotor position, or a hybrid stepper motor (HBS) which is a combination of the BLDC and VRS types and utilizes permanent magnets in the rotor and a reluctance component to produce torque, or so forth. In some embodiments it is contemplated to omit the separate the ball nut assemblies and instead or additionally provide engagement with the lead screw directly via the rotor by forming thread engagements on an inner diameter surface of the rotor. Additionally, a torque taker (not shown) is provided to prevent rotation of the lead screw 200 responsive to operation of the motor 184. In some suitable embodiments, the cam bar housing cover 222 includes guide features (not shown) that engage the latch housing 212 to prevent the latch housing 212 from rotating and thus serve as a torque taker to prevent rotation of the lead screw 200 responsive to operation of the ball nut motor 202. In this arrangement, the lead screw 200 is suitably secured together with a bottom portion 226 of the latch housing 212 so that preventing rotation of the latch housing 212 also prevents rotation of the lead screw 200.

Again with particular reference to FIG. 17, the cam bars 208, when rotated inward, provide a positive full stroke track to guide the engaged latches 214 via camming of the latch fingers 224 against the cam bars 220 as the translating assembly (including the lead screw 200, latch housing 212 and latches 214, and latched connecting rod 204) is withdrawn (i.e., moved upward) or inserted (i.e., moved downward). The hydraulic lifting of the cam bars 208 instigates a four-bar linkage action via cam bar links 209 that connect the cam bars 208 with a cam bar support housing 232. Each cam bar link 209 is pivotally pinned to the cam bar support housing 232 via a pivot location 234 and to the cam bar 208 by a pivot location 235. In this way, two cam bar links 209 together with the portion of the cam bar support housing 232 between the pivot locations 234 of the cam bar links and the portion of the cam bar 208 between the pivot locations 235 of the cam bar links together define a four-bar linkage. Optionally, more than two cam bar links 209 per cam bar 208 can be provided—in the illustrative example four cam bar links 209 per cam bar 208 are provided (see FIG. 16). Hydraulic lifting of the cam bars 208 causes the cam bar links 209 to pivot upward about the pivot locations 234 and thus force the lifting cam bars 208 inward via the pivot locations 235. When the cam bars 208 are moved to their full inward position, the cam bar links 209 are closest to, but below, horizontal, e.g. at a minimum angle of 20° from the horizontal in some contemplated embodiments, which reduces the likelihood that the four-bar linkage may jam in a horizontal null position.

With particular reference now to FIG. 18, the cam bars 208 are shown lowered at their maximum outward position. Again said briefly, hydraulic lowering of the cam bars 208 (or, gravitational, spring-biased, and/or other lowering of the cam bars 208 responsive to removal of the hydraulic lifting force) causes the cam bar links 209 to pivot downward about the pivot locations 234 and thus force the lifting cam bars 208 outward by a four-bar linkage action. The outward movement of the cam bars 208 allows the latches 214 to freely rotate or pivot outward about the pivot locations 216 and disengage from the connecting rod 204 to initiate scram of the connecting rod 204 and hence of the control rods connected with the connecting rod 204. The scram action is failsafe in that the weight of the connecting rod 204, with the assist of latch springs 240, disengages the latches 214. More particularly, the latch springs 240 are compressively held between the latch housing 212 and the upper portions of the latches 214 (above the pivot positions 216) so that they bias the upper portions of the latches 214 inward and consequently bias outward the lower portions of the latches 214 (below the pivot positions 216, i.e. including the latch fingers 224).

When moved outward to full disengagement, the cam bars 208 are supported along their full length by the cam bar support housing 232 which provides a positive stop for their outward movement. When the cam bars 208 are moved to their full outward position, the cam bar links 209 are closest to, but not exactly, vertical, for example at a minimum angle of 20° from the vertical in some embodiments, which reduces the likelihood that the four-bar linkage may jam in a vertical null position.

Figure 19:
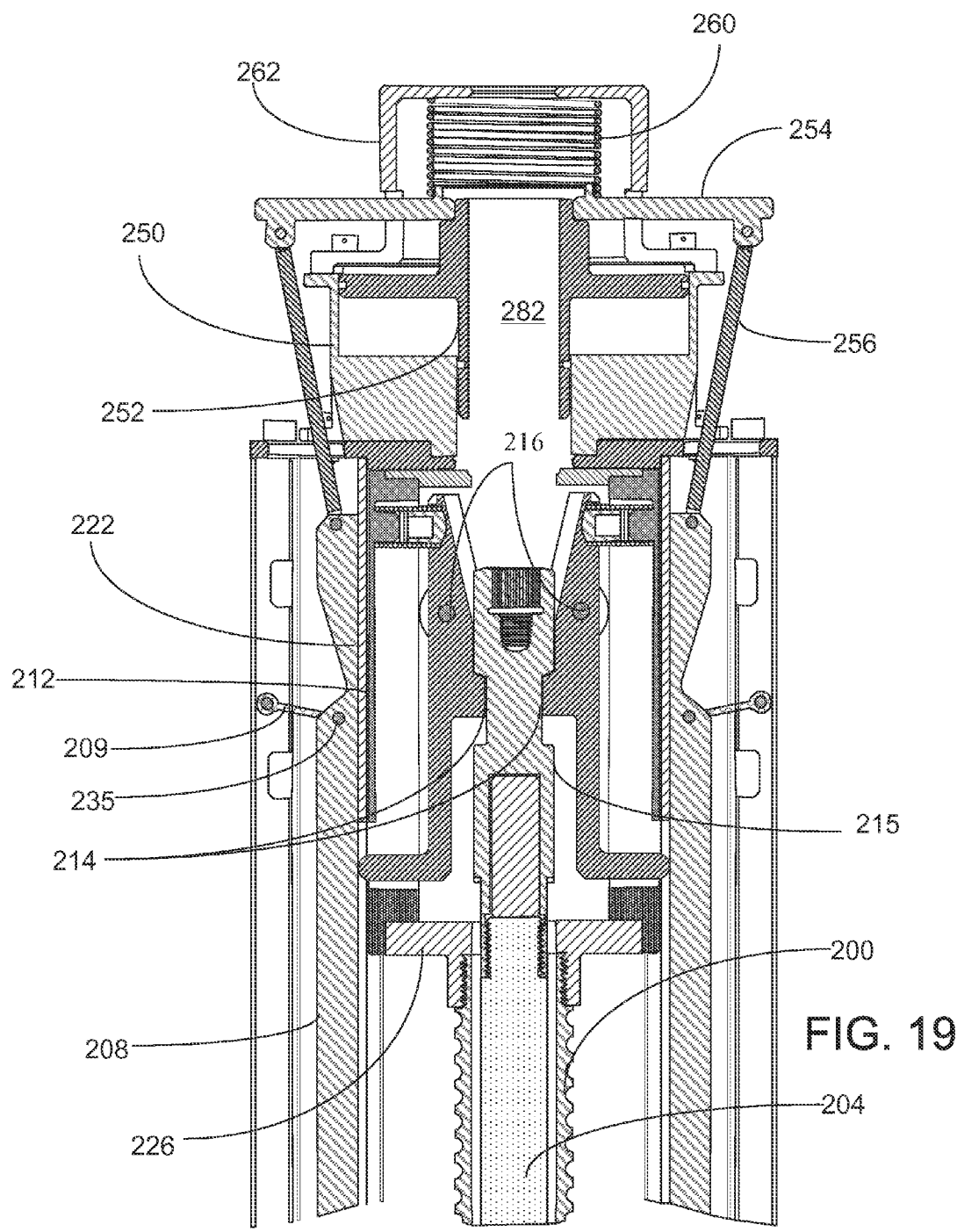
Figure 20:
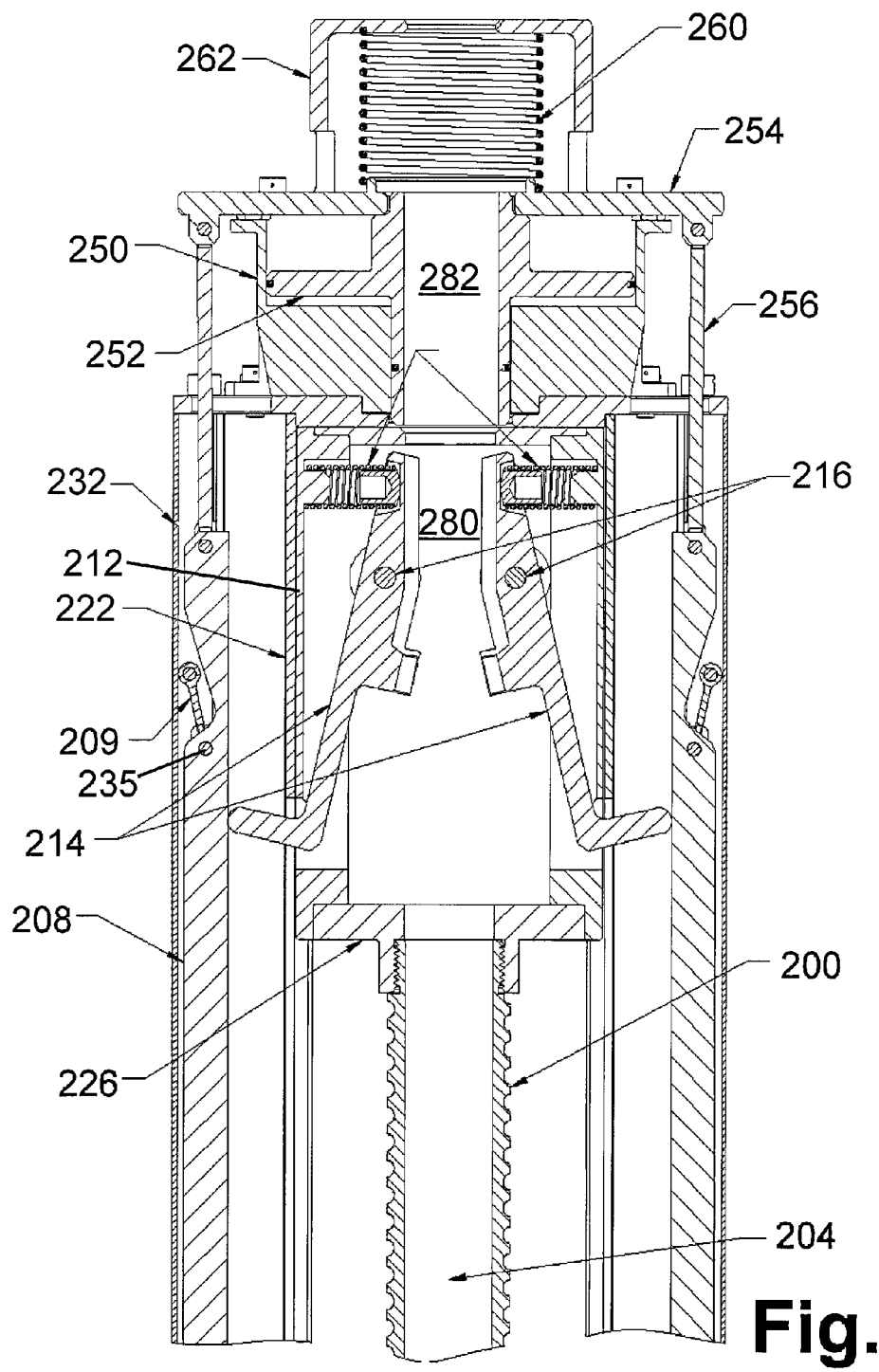

With reference to FIGS. 19 and 20, the upper end of the control rod drive mechanism (CRDM) including the hydraulic lift system 210 is illustrated in additional detail. The hydraulic lift system 210 includes a hydraulic cylinder 250 and hydraulic piston 252. Cam bar hangers 254 are coupled with the top of the piston 252, and connection links 256 extend downward from the cam bar hangers 254 to the upper portions of the cam bars 208. During normal operation (FIG. 19) the hydraulic cylinder 250 is pressurized so as to raise the piston 252 and so raise the cam bars 208 via the linkages 254, 256. This causes the latches 214 to engage with the upper end 215 of the connecting rod 204, as described herein with reference to FIG. 17. During scram (FIG. 20), the hydraulic cylinder 250 is depressurized so that the piston 252, linkages, 254, 256, and cam bars 208 fall under the force of gravity. This causes the latches 214 to disengage from the connecting rod 204, as described herein with reference to FIG. 18. In the hydraulic lift system illustrated in FIGS. 19 and 20, the scram is made failsafe by inclusion of a scram assist spring 260 that spring-biases the piston 252 downward by compression of the scram assist spring 260 between the piston 252 and a hydraulic assembly cap 262.

In FIGS. 19 and 20, the lead screw 200 is shown fully withdrawn for illustration purposes, so that the latch system is also visible in the view of FIGS. 19 and 20. However, the operation of the hydraulic lift system 210 as described with reference to FIGS. 19 and 20 is applicable for any position of the lead screw 200.

With particular reference to FIG. 19, as was described previously with reference to FIG. 17, in the normal (latched) state the cam bars 208 are raised and, due to action of the cam bar links 209, are at their maximum inward position. The inward movement of the cam bars 208 rotates or pivots the latches 214 into full engagement with the top end 215 of the connecting rod 204. Also, when moved inward to full engagement the cam bars 208 are supported along their full length by the cam bar housing cover 222 which provides a positive stop for their inward movement.

With continuing reference to FIG. 19, in the engaged condition the hydraulic piston 252 is in the fully raised position due to pressurization of the hydraulic cylinder 250. As the piston is raised the cam bar hanger 254 is lifted by the piston 252 and pulls upward on the pair of connection links 256 which in turn lift the cam bars 208. The piston 252 also lifts against the downward force produced by the scram assist spring 260. In some contemplated embodiments, the hydraulic piston lift assembly operates at a differential pressure of only 5.5 psi, although design for higher differential pressure operation is also contemplated.

With particular reference to FIG. 20, as was described previously with reference to FIG. 18, in the scrammed (unlatched) state the cam bars 208 are lowered and, due to the four-bar linkage action of the cam bar links 209, are at their maximum outward position. The outward movement of the cam bars 208 allows the latches 214 to freely pivot or rotate and disengage from the connecting rod 204. In illustrative FIG. 20, the connecting rod 204 has scrammed out of view to the fully inserted position, and hence the connecting rod 204 is not shown in FIG. 20. When moved outward to full disengagement, the cam bars 208 are supported along their full length by the cam bar support housing 232 which provides a positive stop for their outward movement.

With continuing reference to FIG. 20, in order to scram the pressure in the hydraulic cylinder 250 at the bottom side of the piston 252 is evacuated to allow the piston 252 to lower. In a suitable approach, the depressurization is accomplished by a double-acting valve (not shown) that simultaneously cuts the supply pressure to the piston 252 while evacuating the piston cavity to the reactor environment. If the valve fails, it fails in an open state to the dump side for scram reliability. A large flow area valve is optionally employed to provide fast evacuation of the (typically small-volume) piston cavity. Once the pressure is dumped, the combined weight of the cam bars 208, the linkages 254, 256, and the piston 252 gravitationally drive lowering of the cam bars 208 and resultant disengagement of the latches 214. Optionally, as in the illustrated embodiment the scram assist spring 260 is provided in or with the hydraulic lift assembly to assist in lowering the piston 252 and cam bars 208. The scram action is preferably also failsafe in that the connecting rod weight, with the assist of the latch springs, disengages the latches. Camming action by the cam bar links 209 also pushes the cam bars 208 outward toward disengagement.

Reengagement of the latch assembly 206 with the connecting rod 204 after a scram can be performed similarly to the reengagement process described with particular reference to FIGS. 12 and 13 for the embodiment of FIGS. 6-15. The electric motor 184 is driven to move the latching assembly 206 and lead screw 200 (which, again, are secured together) downward toward the top 215 of the scrammed connecting rod 204. The hydraulic cylinder 250 remains depressurized and the latches 214 remain in the disengaged position due to bias of the latch springs 240, as shown in FIG. 18. Thus, the latches 214 can be driven downward by the motor 184 to align with the mating region at the upper end 215 of the connecting rod 204. In the illustrated embodiment, the magnet 113 disposed at or near the top 215 of the connecting rod 204 is magnetically sensed by a position indicator (not shown) in the latching assembly 206 in order to detect when the latches 214 are aligned with the mating region at the upper end 215 of the connecting rod 204. Once the latches 214 are aligned with the mating region at the upper end 215 of the connecting rod 204, the hydraulic cylinder 250 is re-pressurized to lift the hydraulic piston 252 and thus raise the cam bars 208 and reengage the latches 214. Thereafter, the electric motor 184 can be operated to drive the lead screw 200 and re-latched connecting rod 204 upward to a desired operational position.

In an alternative embodiment, the hydraulic lift system 210 described with illustrative reference to FIGS. 19 and 20 can be replaced by an electric solenoid lift assembly, for example suitably located at the top of the control rod drive mechanism (CRDM) in place of the illustrative hydraulic lift assembly 210. Such an electric solenoid lift assembly can be suitably connected with the illustrative four-bar linkage latch cam system, and the latch assembly 206 functions as described herein. In this alternative embodiment, instead of applying pressure to the hydraulic piston 252 to provide the lifting force for engaging the cam bar assemblies, the lifting force is provided by applying electrical power to the solenoid. When electric power is cut the lifting force is immediately lost, the cam bars disengage the latches and the control rod cluster scrams as described herein.

Figure 21:
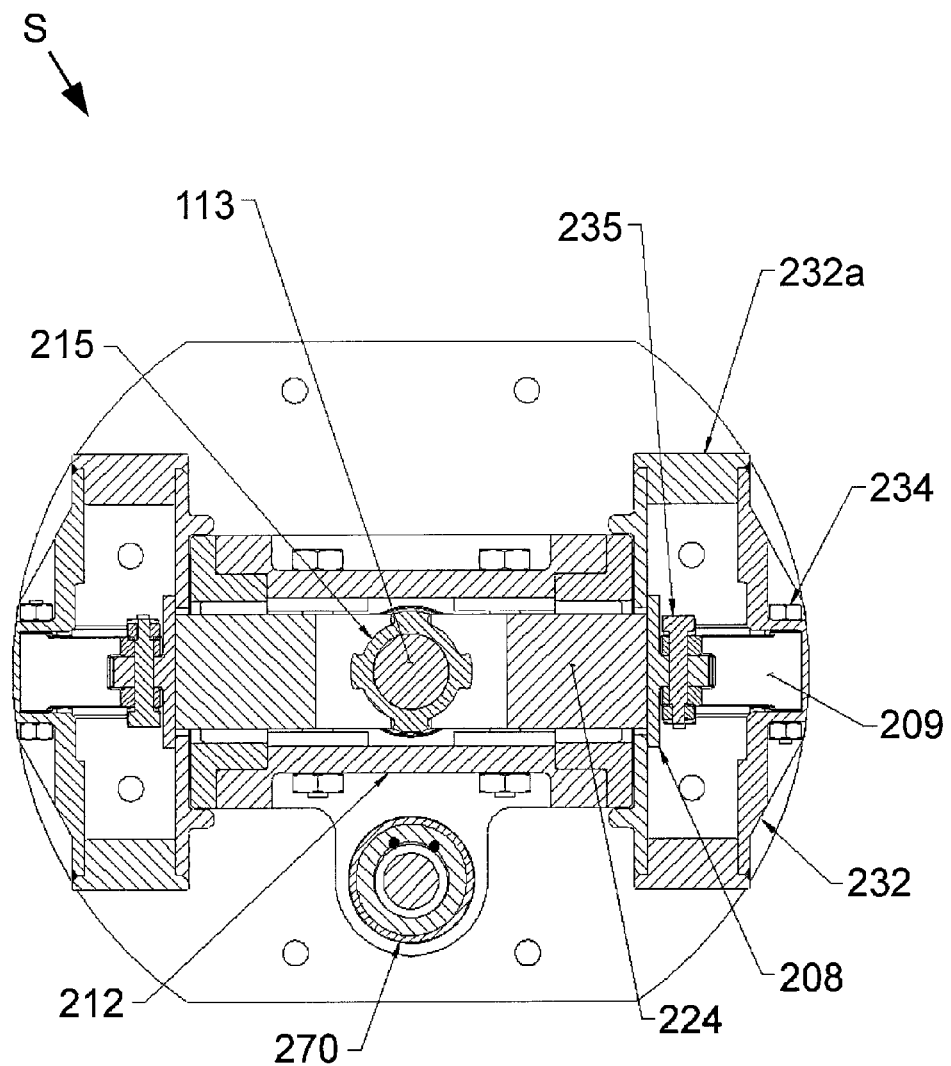

With reference back to FIG. 17 and with further reference to FIG. 21, a section S indicated in FIG. 17 is shown in FIG. 21. The section S passes through a coupling between each cam bar 208 and one of its coupling cam bar links 209, and through the finger 224 of each latch 214, and through the position sensor magnet 113. The sectional view S shown in FIG. 21 includes the cam bar support housing 232 and an supporting cam housing assembly 232a, and the latch housing 212, and the top 215 of the connecting rod 204 with sectioning through the position sensor magnet 113. The sectional view S further includes sectioning through the two cam bars 208 and their latch fingers 224, and shows cam links 209 and their pivot locations 234 connecting with the cam bar support housing 232, with sectioning through their pivot locations 235 connecting with the latch housing 212. As seen in FIG. 21, the pivot locations 234, 235 are suitably embodied by pins. The sectional view S of FIG. 21 also shows an illustrative magnetic position indicator assembly 270 that senses the magnet 113 in the top end 215 of the connecting rod 204 based on magnetic coupling between the indicator assembly 270 and the magnet 113.

As already mentioned, the connecting rod 204 is connected at its lower end with a control rod bundle. Optionally, this connection is via one or more intermediate linkages, for example the illustrative yokes 86, 88 shown in FIG. 6.

Figure 22:
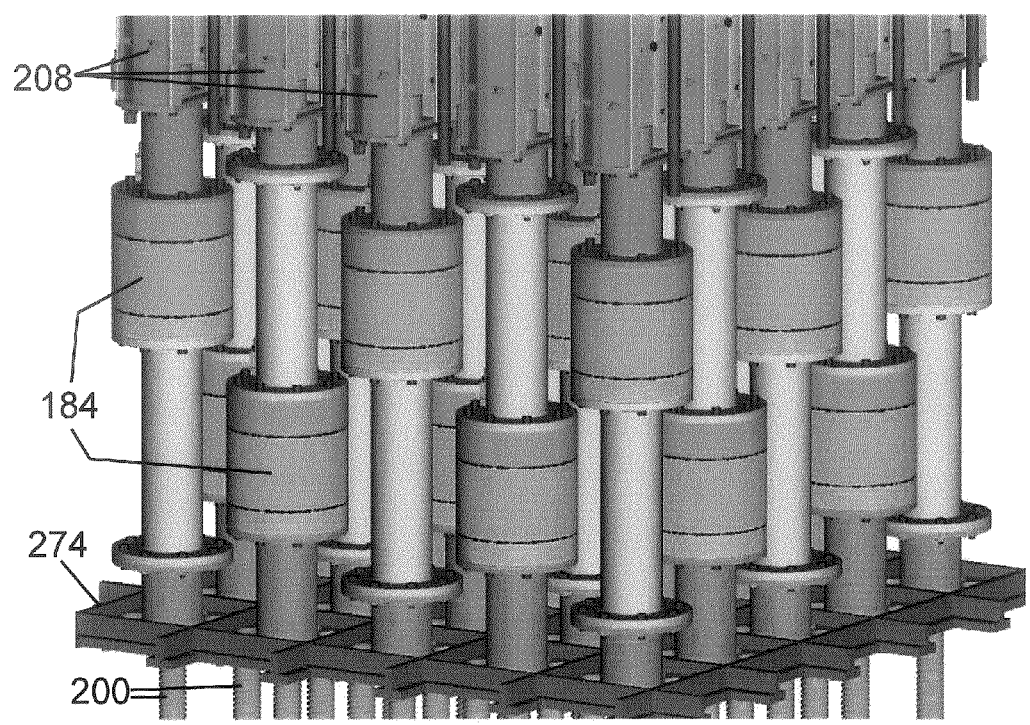
FIGS. 22 and 23 show perspective and perspective partial sectional views, respectively, of a suitable array of CDRM employing a staggered vertical motor arrangement.
Figure 23:
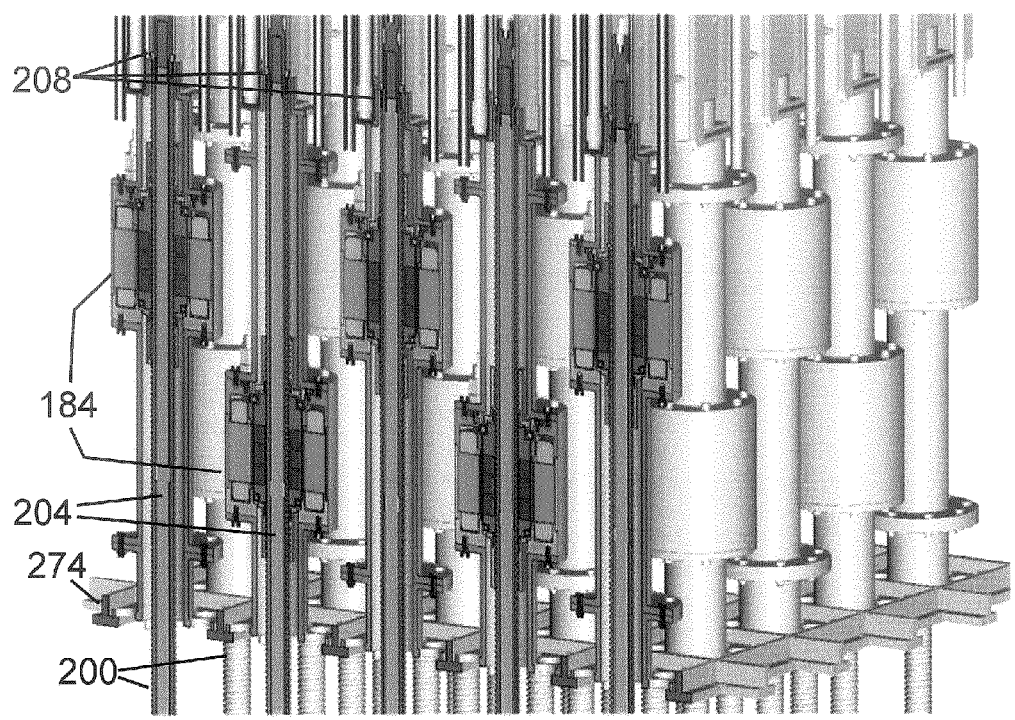

With reference to FIGS. 22 and 23, the nuclear reactor typically includes an array or other plurality of control rod clusters operated by corresponding control rod drive mechanisms supported by a suitable support frame 274 (for example, as shown in greater detail in FIG. 2). In some embodiments, the electric motor 184 is the bulkiest component of the CDRM. In the illustrative array shown in FIGS. 22 and 23, the bulky motors 184 are accommodated in a compact array by vertically staggering the positions of the motors 184 so that the motors 184 of any two adjacent CRDM are not at the same vertical level or height. This enables a more compact array as compared with conventional arrangements in which all the motors are at the same vertical level or height.

The CRDM embodiments described with reference to FIGS. 6-21 advantageously provide both "grey rod" incremental control capability and also provide an efficient scram capability and hence can perform the task normally allocated to dedicated shutdown rods (e.g., as described herein with reference to FIGS. 3-5). Accordingly, it is contemplated to omit dedicated shutdown rods and instead rely wholly on control rods of embodiments such as those of FIGS. 6-21, for example arranged as shown in FIGS. 22 and 23. In a variant embodiment, to provide further redundancy in a LOCA or other emergency event, it is contemplated to employ a configuration including: (i) no dedicated shutdown rods; (ii) a first set of control rods with hydraulic lift as described herein with reference to FIGS. 16-21 so that in an emergency the rods perform the shutdown function via a hydraulic mechanism; and (iii) a second set of control rods with configured to perform the shutdown function via an electromagnetic mechanism. The latter set (iii) can be embodied, for example, by control rods conforming with the embodiment described herein with reference to FIGS. 6-15, or alternatively by control rods conforming with the embodiment described herein with reference to FIGS. 16-21 but with the hydraulic lift system 210 replaced by a solenoidal lift system. Such an arrangement advantageously uses (or can use) all available control rods for reactivity control while also providing a two-fold redundant (hydraulic and electromagnetic) safety system.

With reference back to the CRDM embodiments of FIGS. 6-20, an advantage of employing a latch to decouple the connecting rod 204 from the lead screw 200 (and, hence, to decouple the connecting rod 204 from the CRDM) is that the CRDM can be configured for removal of the connecting rod 204 through the CRDM without first removing the CRDM. To provide this capability, the CRDM is constructed with a hollow central region providing a pass-through by which the connecting rod 204, once unlatched from the lead screw 200, may pass. A cylindrical opening 280 (see FIGS. 18 and 20) through the latch assembly is made large enough for the connecting rod 204 to pass through when the latches 214 are open. In the embodiment of FIGS. 6-15, such an opening can be provided by replacing the centrally positioned latch spring 174 with a side-positioned biasing mechanism similar to the latch springs 240 of the embodiment of FIGS. 16-21. For the embodiment of FIGS. 16-21, a cylindrical opening 282 is also provided through the hydraulic lift system 210 (see FIGS. 19 and 20). Both openings 280, 282 are made large enough for the connecting rod 204 to pass through when the latches 214 are open. Regarding the latter opening 282, the scram assist spring 260 is suitably an annular spring providing for the opening 282, and the piston 252 is also suitably made hollow with the requisite inner diameter. In the case of an alternative lifting mechanism, such as a solenoidal lift, the solenoid is suitably hollow.

Figure 24:
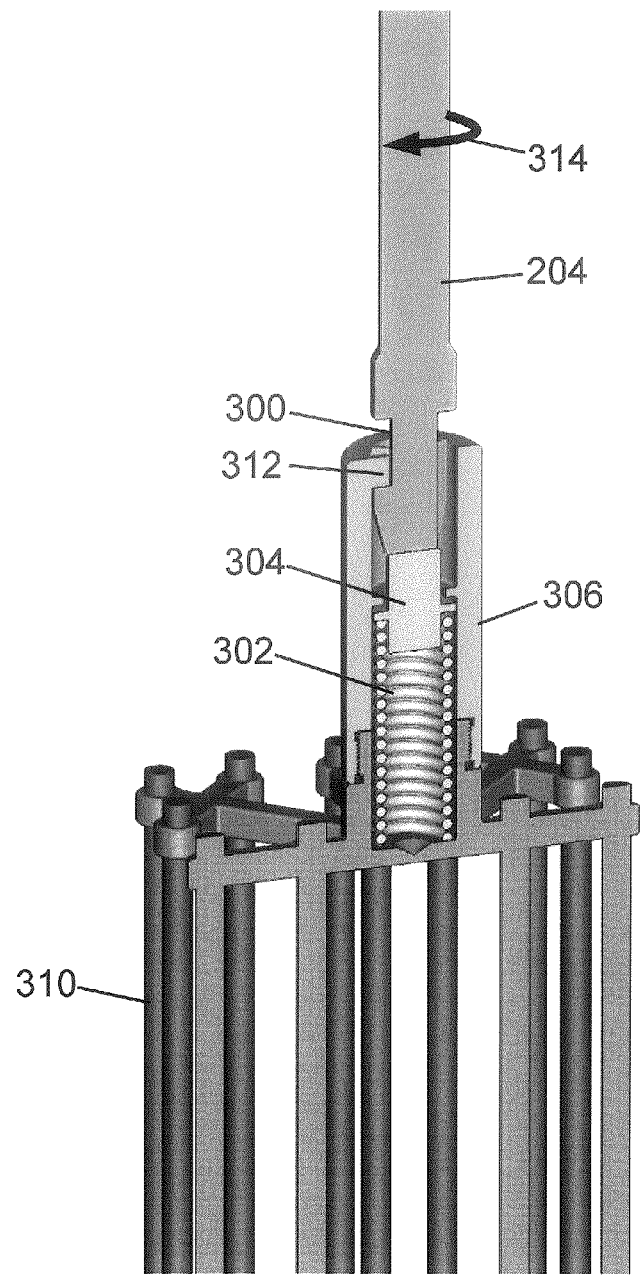
FIGS. 24 and 25 show perspective and exploded perspective views, respectively, of a "J"-groove coupling between the lower end of a connecting rod and a rod cluster assembly.
Figure 25:
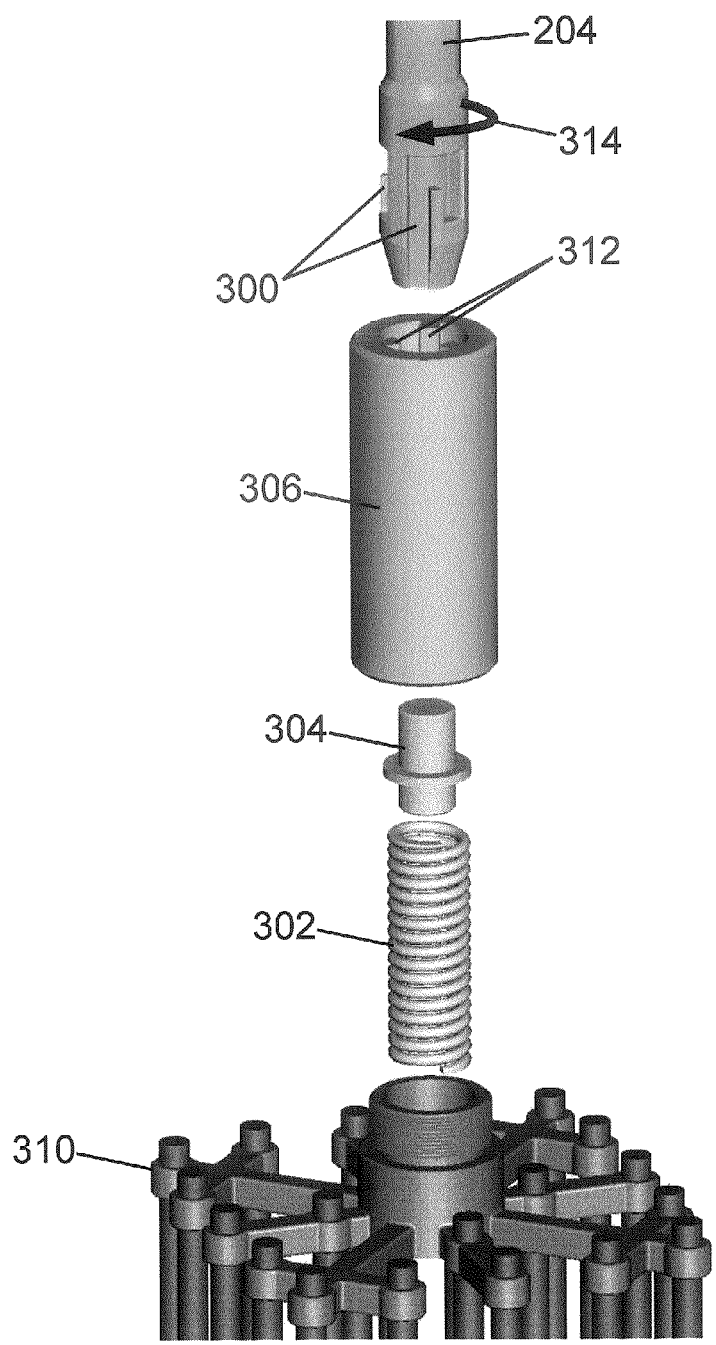

With reference to FIGS. 24 and 25, for the connecting rod 204 to be removable through the CRDM it should be detachably connected with the spider or other mechanical control rod structure in such a way that (i) it can be detached from the spider from above the CRDM and (ii) so that the outer diameter of the connecting rod 204 at the detachable connection is not so large so as to prevent withdrawal of the lower end of the connecting rod 204 through the openings 280, 282. FIGS. 24 and 25 show one suitable detachable connection, in which a low-profile "J-groove" couples the connecting rod 204 with the control rod bundle. In this illustrative detachable connection, one or more inverted "J" shaped grooves 300 are formed in the lower end of the connecting rod 204. Since these grooves are recessed into the connecting rod 204, the J-grooves 300 do not increase the outer diameter of the connecting rod 204 at the lower end. A biasing spring 302 is terminated at the end proximate to the connecting rod 204 by a spring guide/capture element 304, and the elements 302, 304 are disposed inside a generally cylindrical rod cluster threaded cap 306 that secures to the top of a rod cluster 310. The cluster cap 306 includes mating tabs 312 that are sized and positioned to slide into the inverted J-shaped grooves 300 of the connecting rod 204. To establish the coupling, the long vertical portions of the inverted J-shaped grooves 300 are aligned with the mating tabs 312 of the cluster cap 306, and the connecting rod 204 is then pushed downward against the compressive force of the spring 302 such that the tabs 312 enter the long vertical portions of the grooves 300. When the connecting rod 204 is pushed down far enough for the tabs 312 to reach the horizontal portions of the inverted J-shaped grooves 300, the connecting rod is rotated by a rotation 314 (which is clockwise in FIGS. 24 and 25) until the tabs 312 align with the short vertical portions of the inverted J-shaped grooves 300. At that point, removal of the downward force allows the upward spring force generated by the spring 302 to push the connecting rod 204 upward in order to lock the tabs 312 into the short vertical portions of the inverted J-shaped grooves 300. The process is reversed to decouple the connecting rod 204 from the rod cluster 310. After removal, the spring 302 and guide/capture element 304 are retained at the rod cluster 310 by the cluster cap 306.

Thus, the coupling/decoupling of the connecting rod 204 with the rod cluster 310 advantageously can be performed with the latches 214 disengaged, so that the connecting rod 204 can be installed or removed with the CDRM in place. This is made possible because the lead screw 200 and the connecting rod 204 are not directly connected together, but rather are coupled by the latch assembly 206. When the latches 214 are disengaged, the connecting rod 204 can move freely inside the substantially hollow lead screw 200, and if the hydraulic piston 252 (or hollow solenoid, in the case of an electromagnetic lifting mechanism) is also made substantially hollow and the hydraulic cylinder 250 is annular with a sufficiently large inner diameter, then the connecting rod 204 can also pass through the hydraulic lift assembly 210. Thus, installation of the connecting rod 204 amounts to inserting the connecting rod 204 into the opening of the CDRM and pushing it down until it presses against the spring 302 (see FIGS. 24 and 25) and then rotating the connecting rod 204 as per the illustrated rotation 314 and releasing the connecting rod 204 so that the force of the spring 302 completes locking of the coupling. To remove the connecting rod 204, the process is reversed.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A control rod mechanism for use in a nuclear reactor, the control rod mechanism comprising:
   at least one control rod comprising neutron-absorbing material and configured for insertion in a reactor core;
   a hollow lead screw;
   a motor including a rotor, the motor operatively coupled with the hollow lead screw by a threaded connection, the motor configured to rotate the rotor to drive the hollow lead screw via the threaded connection linearly toward or away from the reactor core;
   a lifting rod configured to support the weight of the at least one control rod, the lifting rod disposed partially inside the hollow lead screw; and
   a latch assembly mounted on the hollow lead screw and having latches configured to be closed by applied power to latch the lifting rod to the hollow lead screw, the latches of the latch assembly being further configured to open responsive to removal of the applied power to unlatch the lifting rod from the hollow lead screw,
   wherein the unlatched lifting rod and the at least one control rod are configured to fall toward the reactor core; and
   wherein the hollow lead screw is configured to remain operatively coupled with the motor by the threaded connection and to not fall toward the reactor core when the latches of the latch assembly open.

2. The control rod mechanism as set forth in claim 1, wherein the at least one control rod comprises a plurality of control rods and the lifting rod is configured to support the weight of the plurality of control rods via at least one of a spider and a yoke.

3. The control rod mechanism as set forth in claim 1, wherein the applied power is applied hydraulic power.

4. The control rod mechanism as set forth in claim 1, wherein the latch assembly comprises:
   a lifting assembly configured to receive the applied power;
   cam bars arranged parallel with the hollow lead screw and connected with the lifting assembly, the lifting assembly configured to operate under the applied power to lift the cam bars; and
   a four-bar mechanical linkage configured to move the cam bars inward while keeping the cam bars arranged parallel with the hollow lead screw in response to the cam bars being lifted by the lifting assembly to cam the cam bars against the latches to close the latches.

5. The control rod mechanism as set forth in claim 4, wherein the length of the cam bars in the direction parallel with the hollow lead screw is sufficient for the cam bars to cam against the latches of the latching assembly for any position of the hollow lead screw obtainable by driving the hollow lead screw using the motor.

6. A control rod drive mechanism (CRDM) comprising:
   a hollow lead screw having an inner diameter;
   a lifting rod configured to support the weight of a control rod comprising neutron-absorbing material and configured for insertion in a reactor core, a portion of the lifting rod being disposed inside the hollow lead screw;
   a motor threadedly coupled with the hollow lead screw and configured to linearly drive the hollow lead screw in an insertion direction or an opposite withdrawal direction;
   a latch assembly mounted on the hollow lead screw and configured to (i) latch the lifting rod to the hollow lead screw in response to applied power and to (ii) unlatch the lifting rod from the hollow lead screw while the latch assembly remains mounted on the hollow lead screw in response to removal of the applied power, the lifting rod being configured to be free to fall in the insertion direction when unlatched;
   wherein the motor is configured to remain threadedly coupled with the lead screw to prevent the lead screw from falling when the latch assembly is either latched or unlatched.

7. The CRDM as set forth in claim 6, wherein the latch assembly is hollow and is configured to allow the lifting rod to be removed from the CRDM with the latch assembly unlatched by withdrawing the lifting rod in the withdrawal direction through the CRDM and through the hollow latch assembly.

8. The CRDM as set forth in claim 6, wherein the applied power is hydraulic power and the latch assembly includes a hydraulic lift assembly configured to latch the latch assembly when pressurized.

9. The CRDM as set forth in claim 6, wherein the latch assembly comprises:
   latches configured to latch to the lifting rod;
   elongated members arranged parallel with the hollow lead screw;
   a lift mechanism configured to lift the elongated members when powered by the applied power; and
   four-bar linkages configured to respond to the lifting of the elongated members by moving the elongated members toward the latches while keeping the elongated members arranged parallel with the hollow lead screw to cam the elongated members against the latches to latch the latch assembly.

10. The CRDM as set forth in claim 9, wherein the lift mechanism is selected from a group consisting of (i) a hydraulic piston and (ii) an electric solenoid.

11. The CRDM as set forth in claim 6, further comprising:
   at least one ball nut assembly providing the threaded coupling between the motor and the hollow lead screw.

12. A control rod drive mechanism (CRDM) comprising:
   a hollow lead screw;
   a drive assembly including a non-separable ball nut coupled with the outside of the hollow lead screw, the drive assembly configured to linearly drive the hollow lead screw in an insertion or opposite withdrawal direction by rotating the non-separable ball nut coupling with the outside of the lead screw, the non-separable ball nut configured to not move in the insertion or opposite withdrawal direction;
   a lifting rod configured to support the weight of at least one control rod and disposed partially inside the hollow lead screw; and
   a latch assembly with mounted to the hollow lead screw and having (i) a latched state in which the latch assembly is latched to the lifting rod and (ii) an unlatched state in which the latch assembly is not latched to the lifting rod; and
   a latch closing mechanism configured to latch the latch assembly to the lifting rod and to unlatch the latch assembly from the lifting rod in response to removal of applied power to the latch closing mechanism.

13. The CRDM as set forth in claim 12, wherein the latch closing mechanism includes one of (i) a hydraulic piston and (ii) an electric solenoid.

14. The CRDM as set forth in claim 12, wherein the latch closing mechanism includes a four-bar mechanical linkage having a length parallel with the lead screw that is at least as long as a stroke of the drive assembly.

15. An apparatus comprising:
at least one control rod;
a lifting rod configured to support the weight of the at least one control rod at a lower end of the lifting rod; and
a control rod drive mechanism (CRDM) including:
    a latch assembly configured to have (i) a latched state in which the latch assembly is latched to an upper end of the lifting rod and (ii) an unlatched state in which the latch assembly is not latched to the upper end of the lifting rod, and
    a linear drive mechanism configured to drive the latch assembly linearly toward or away from a nuclear reactor core.

16. The apparatus as set forth in claim 15, wherein the CRDM is hollow and configured to allow the lifting rod to be removed with the latch assembly in the unlatched state by drawing the lifting rod away from the nuclear reactor core through the CRDM.

17. The apparatus as set forth in claim 15, wherein:
the linear drive mechanism of the CRDM includes a hollow lead screw through which the lifting rod is free to move and a motor threadedly coupled with the hollow lead screw to linearly drive the hollow lead screw toward or away from the nuclear reactor core; and
the latch assembly includes latches mounted on an upper end of the hollow lead screw, the latches being configured to latch to the upper end of the lifting rod in the latched state.

18. The apparatus as set forth in claim 17, wherein, in the unlatched state of the latch assembly, the motor of the linear drive mechanism of the CRDM remains threadedly coupled with the hollow lead screw.

19. The apparatus as set forth in claim 15, wherein:
the unlatched lifting rod is configured to fall toward the nuclear reactor core, and
no portion of the CRDM is configured to fall toward the nuclear reactor core in either the latched state or the unlatched state of the latch assembly.

* * * * *